United States Patent
Morise

(10) Patent No.: US 7,232,087 B2
(45) Date of Patent: Jun. 19, 2007

(54) SPINNING REEL DRAG MECHANISM

(75) Inventor: Taisei Morise, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/374,118

(22) Filed: Mar. 14, 2006

(65) Prior Publication Data
US 2006/0231657 A1 Oct. 19, 2006

(30) Foreign Application Priority Data
Apr. 15, 2005 (JP) ............................ 2005-117779
Apr. 15, 2005 (JP) ............................ 2005-117780

(51) Int. Cl.
*A01K 89/02* (2006.01)
(52) U.S. Cl. ........................ 242/244; 42/246
(58) Field of Classification Search ................ 242/244, 242/245, 246
See application file for complete search history.

(56) References Cited

U.S. PATENT DOCUMENTS

| | | | | |
|---|---|---|---|---|
| 2,646,939 A | * | 7/1953 | Hirsch | 242/268 |
| 3,682,411 A | * | 8/1972 | Dumbauld | 242/246 |
| 4,577,808 A | * | 3/1986 | Kawabe | 242/245 |
| 4,702,432 A | * | 10/1987 | Kaneko et al. | 242/246 |
| 4,728,054 A | * | 3/1988 | Pisapio | 242/258 |
| 4,796,828 A | | 1/1989 | Councilman | |
| 5,603,465 A | * | 2/1997 | Henriksson | 242/246 |
| 5,947,400 A | | 9/1999 | Tsutsumi | |
| 6,318,655 B1 | * | 11/2001 | Henze | 242/244 |
| 6,598,819 B2 | * | 7/2003 | Furomoto | 242/319 |
| 6,679,445 B2 | * | 1/2004 | Morise et al. | 242/322 |
| 6,726,137 B1 | * | 4/2004 | Li | 242/238 |
| 6,874,718 B1 | * | 4/2005 | Chang | 242/246 |

FOREIGN PATENT DOCUMENTS

| | | |
|---|---|---|
| EP | 0 071 686 A2 | 12/1981 |
| EP | 1 222 855 A1 | 7/2002 |
| JP | 2002-345369 | 3/2002 |

* cited by examiner

*Primary Examiner*—Emmanuel Marcelo
*Assistant Examiner*—Evan H. Langdon
(74) *Attorney, Agent, or Firm*—Global IP Counselors, LLP

(57) ABSTRACT

A drag mechanism is arranged between a spool and a spool shaft and includes at least one first drag washer, at least one second drag washer and a drag knob. The at least one first drag washer has on an outer circumferential portion with at least one interlock protrusion. The at least one second drag washer is arranged with respect to the first drag washer along an axial direction of the spool. The drag knob is configured to be threaded onto the spool shaft to selectively adjust an amount of pressure acting on the first and second drag washers.

16 Claims, 12 Drawing Sheets

SPINNING REEL DRAG MECHANISM

CROSS-REFERENCE TO RELATED APPLICATIONS

This application claims priority under 35 U.S.C. § 119 to Japanese Patent Application Nos. 2005-117779 and 2005-117780. The entire disclosure of Japanese Patent Application Nos. 2005-117779 and 2005-117780 is hereby incorporated herein by reference.

BACKGROUND OF THE INVENTION

1. Field of the Invention

The present invention generally relates to a drag mechanism. More specifically, the present invention relates to a drag mechanism configured to brake a rotation of the spool.

2. Background Information

In order to reduce a tensile force acting on a fishing line, some spinning reels are provided with a mechanism configured to brake the spool. Such mechanisms are called drag mechanisms. One widely used type of drag mechanism is a front drag mechanism, which is housed inside a drag housing recess formed inside a bobbin trunk onto which the fishing line is wound. A front flange is arranged on a frontward end of the bobbin trunk. The front flange is provided either as an integral part of the bobbin trunk or as a separate entity. One known method of fastening the front flange to the bobbin trunk when the front flange is provided as a separate entity is to use a flange fastening member. The flange fastening member is fastened to the bobbin trunk by being screwed into an internal circumferential surface of a frontward portion of the drag housing recess (see, for example, Japanese Patent Publication No. 2002-345369).

In a conventional spinning reel, a portion of the flange fastening member that screws into the drag housing recess has a cylindrical section on an external circumferential surface. An externally threaded section is formed on the external circumferential surface. The externally threaded section mates with an internally threaded section formed on an internal circumferential surface of the bobbin trunk. Since the flange fastening member is screwed into the internal circumferential surface of the bobbin trunk instead of fastened with bolts, it is not necessary to provide bolt holes between an outside edge of the bobbin trunk and the drag housing recess. As a result, a wall thickness of the bobbin trunk is reduced and an internal diameter of the drag housing recess is increased, thereby enabling a larger drag force to be obtained due to a larger drag diameter. In particular, in a deep groove spool in which a difference between external diameters of the front flange and the bobbin trunk is large, the internal diameter of the drag housing recess is smaller than in a shallow groove spool. Using a flange fastening member that screws into the drag housing recess makes it easier to increase the drag diameter and obtain a larger drag force in deep groove spools.

The conventional front drag mechanism has one or more drag washers and a drag knob. The one or more drag washers are housed inside the internal circumference of the spool. The drag knob is configured to screw onto the frontward end of the spool shaft. The drag knob is configured to enable the amount of pressure applied to the one or more drag washers to be adjusted. The drag washers include a first drag washer and a second drag washer. The first drag washer is arranged such that it is non-rotatable with respect to the spool. The second drag washer is arranged such that it is non-rotatable with respect to the spool shaft. The first and second drag washers are arranged alternately. A pair of interlock protrusions configured to engage with interlock grooves formed in the internal circumferential surface of the drag housing recess is provided on an external circumference of the first drag washers. The interlock protrusions protrude radially outward from the external circumferential surface of the first drag washer and are arranged on diametrically opposite sides of the first drag washer. The first drag washer is rendered non-rotatable with respect to the spool due to the engagement of the interlock protrusions with the interlock grooves. Parallel, axially chamfered sections are formed on the frontward end of the spool shaft and an oval interlock hole configured to engage with the chamfered sections is formed at the center of the second drag washers. The second drag washer is rendered non-rotatable with respect to the spool shaft due to the engagement of the interlock hole with the chamfered sections.

Thus, when assembling a spool in which the front flange is fastened using a flange fastening member that screws into the bobbin trunk of the spool, the drag washers are installed into the drag housing recess after the flange fastening member is installed into the bobbin trunk. For example, consider a case in which a second drag washer is installed and then a first drag washer is installed such that the interlock protrusions engage with the interlock grooves of the drag housing recess. Since both drag washers must be passed through the tubular section on which the externally threaded section of the flange fastening member is provided, the external diameters of the drag washers must be smaller than the internal diameter of the tubular section. Consequently, the internal diameter of the internal circumferential surface of the drag housing recess where the two interlock grooves are formed is considerably smaller than the internal diameter of the tubular section of the flange fastening member.

In the conventional structure described above, the internal diameter of the drag housing recess is smaller than the internal diameter of the flange fastening member so that the first drag washer, which has the pair of interlock protrusions arranged on opposite sides thereof, can be installed. Consequently, the drag diameter is small and it is difficult to obtain a larger drag force. If the internal diameter of the drag housing recess were made to be the same as the internal diameter of the tubular section, the first drag washer would have to be tilted to a great degree when passing it through the tubular section of the flange fastening member in order for the two diametrically oppositely arranged interlock protrusions to fit through. Consequently, the longitudinal dimension of the drag housing space (length of the drag housing space along the axial direction of the spool) would have to be longer in order to accommodate the larger longitudinal length that the first drag washer assumes when it is tilted in order to install it. Furthermore, the number of draw washers would have to be smaller or, if the longitudinal dimension of the drag housing recess is small, it might not be possible to install a first drag washer at all. Therefore, when the longitudinal dimension of the drag housing recess is short, the conventional structure requires the internal diameter of the drag housing recess to be smaller than the internal diameter of the tubular section of the flange fastening member and, thus, does not allow the internal diameter of the drag housing recess to be increased.

In view of the above, it will be apparent to those skilled in the art from this disclosure that there exists a need for an improved spinning reel drag mechanism that maximizes an internal diameter of a drag housing recess. This invention addresses this need in the art as well as other needs, which will become apparent to those skilled in the art from this disclosure.

SUMMARY OF THE INVENTION

The object of the present invention is to provide a drag mechanism having a flange fastening member screwed into a drag housing recess of the spool. The drag mechanism is configured to enable the internal diameter of the drag housing recess to be maximized in relation to the longitudinal dimension of the drag housing recess.

A spinning reel drag mechanism in accordance with a first aspect of the present invention is a spinning reel drag mechanism including at least one first drag washer, at least one second drag washer and a drag knob. The at least one first drag washer has an outer circumferential portion with at least one interlock protrusion configured to engage with an interlock groove of a spool. The outer circumferential portion is free of an interlock protrusion at a section diametrically opposed to the at least one interlock protrusion. The at least one first drag washer is non-rotatable with respect to the spool and has an outside diameter that is smaller than an internal diameter of the spool. The at least one second drag washer is disposed with respect to the first drag washer along an axial direction of the spool. The at least one second drag washer is non-rotatable with respect to a spool shaft. The at least one second drag washer having an outside diameter that is smaller than an internal diameter of the spool. The drag knob is configured and arranged to be threaded onto the spool shaft to selectively adjust an amount of pressure acting on the first and second drag washers to be adjusted.

With this drag mechanism, when, for example, one first drag washer is installed between two second drag washers, first a second drag washer is installed into the drag housing recess with the flange fastening member already installed into the internal circumferential surface of the bobbin trunk. Next, the first drag washer is oriented such that the interlock protrusion is aligned with one of the interlock grooves and tilted such that the interlock protrusion enters the drag housing recess ahead of the rest of the first drag washer. Thus oriented, the first drag washer is then passed through the inside of the tubular section and installed into the internal circumferential surface of the bobbin trunk. Next, the other second drag washer is inserted. Finally, the drag knob is installed to complete the assembly of the drag mechanism. Since the one or more interlock protrusions provided on the first drag washer are arranged within an angular phase of 90 degrees or less, the maximum dimension of the first drag washer (i.e., the length of the longest line segment joining two points on the outside circumference of the washer) is shorter than the maximum dimension of a conventional first drag washer having two interlock protrusions arranged on diametrically opposite sides of the washer (i.e., the distance between the outermost edges of the two interlock protrusions of a conventional second drag washer). As a result, the first drag washer can be tilted to a smaller degree than the conventional first drag washer when it is tilted in order to pass it through the tubular section and, thus, the length that the tilted first drag washer assumes in the longitudinal direction (axial direction) can be shortened. In this way, the internal diameter of the drag housing recess can be increased even if the longitudinal length of the same is shorter.

A spinning reel drag mechanism in accordance with a second aspect of the present invention is a drag mechanism according to the first aspect, wherein the number of said interlock protrusions is one. With this drag mechanism, since there is only one interlock protrusion, the longitudinal dimension (axial length) assumed by the first drag washer when it is tilted is shorter than longitudinal dimension that results when a plurality of interlock protrusions is provided. As a result, the internal diameter of the drag housing recess can be increased even more in relation to the longitudinal length of the drag housing recess.

A spinning reel drag mechanism in accordance with a third aspect of the present invention is a drag mechanism according to the first or second aspect, wherein a seal member is arranged between the drag knob and the flange fastening member, the seal member serving to prevent liquids from penetrating to the drag disks. Since the flange fastening member has a tubular section, the drag housing recess can be sealed by merely installing a seal member between the internal circumferential surface of the tubular section and the external circumferential surface of the drag knob. As a result, a simple structure can be employed to reliably prevent the drag force from changing due to wetness.

A spinning reel drag mechanism in accordance with a fourth aspect of the present invention is a drag mechanism according to the first, second, or third aspect, wherein a drag disk is arranged between the first and second drag washers. Arranging a drag disk between the washers enables smooth slippage to occur between the washers when the drag mechanism is operated.

A spinning reel drag mechanism in accordance with a fifth aspect of the present invention is a drag mechanism according to any one of the first to fourth aspects, wherein a retaining member for retaining the drag washers is detachably arranged between an end face of the tubular section that faces one of the drag washers and said one of the drag washers. With this drag mechanism, since the retaining member secures the drag washers at the end face of the cylindrical section, it is not necessary to provide an annular groove or other interlock groove in the drag housing recess in order to secure the retaining member.

With the present invention, the first drag washer has one interlock protrusion arranged on an outer circumferential portion thereof or a plurality of such interlock protrusions arranged within an angular phase of 90 degrees or less. Consequently, the maximum dimension of the first drag washer (i.e., the length of the longest line segment joining two points on the outside circumference of the washer) is shorter than the maximum dimension of a conventional first drag washer having two interlock protrusions arranged on diametrically opposite sides of the washer (i.e., the distance between the outermost edges of the two interlock protrusions of a conventional second drag washer). As a result, the first drag washer can be tilted to a smaller degree than the conventional first drag washer when it is tilted in order to pass it through the tubular section and, thus, the length that the tilted first drag washer assumes in the longitudinal direction (axial direction) can be shortened. In this way, the internal diameter of the drag housing recess can be increased as much as possible even if the longitudinal length of the same is shorter.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
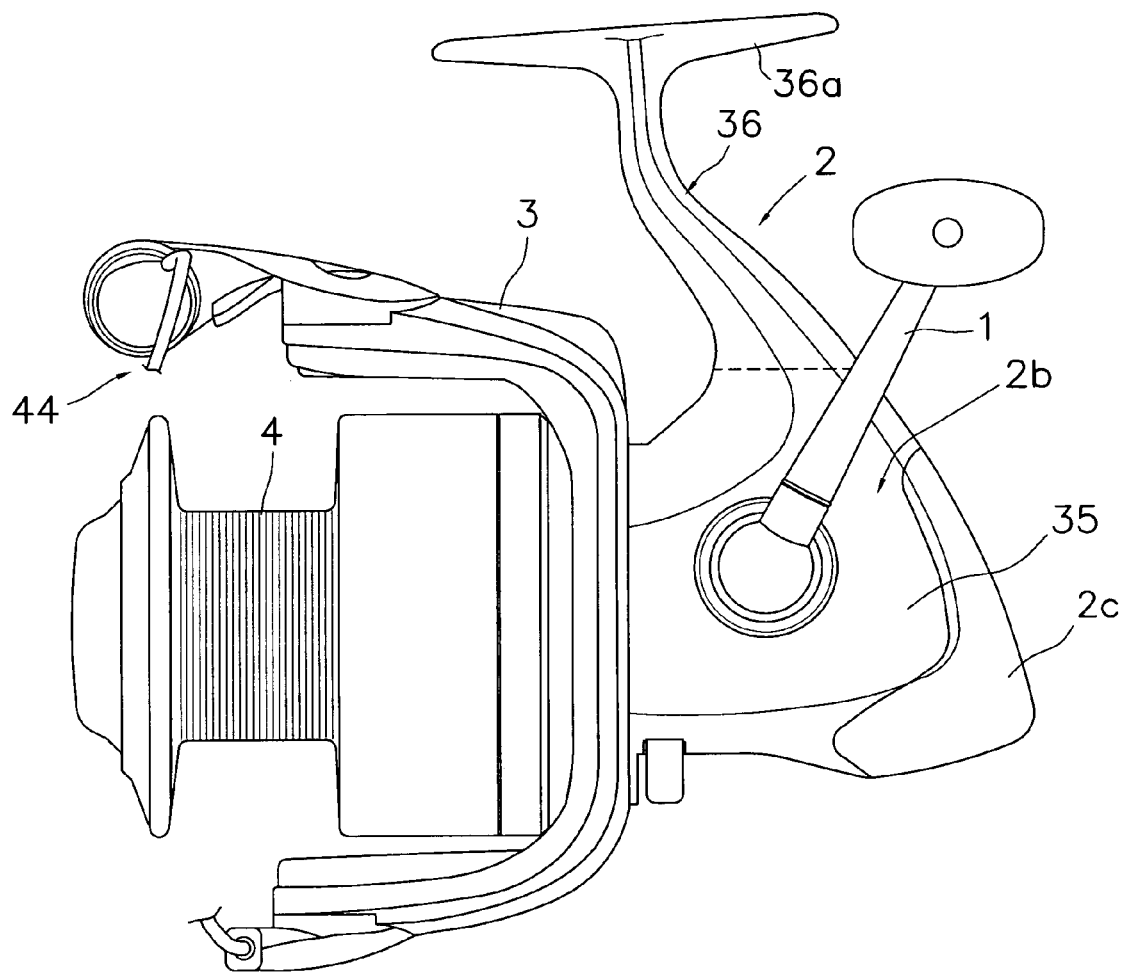
FIG. 1 is a side elevational view of a spinning reel equipped with a spinning reel drag mechanism in accordance with a first embodiment of the present invention.
Figure 2:
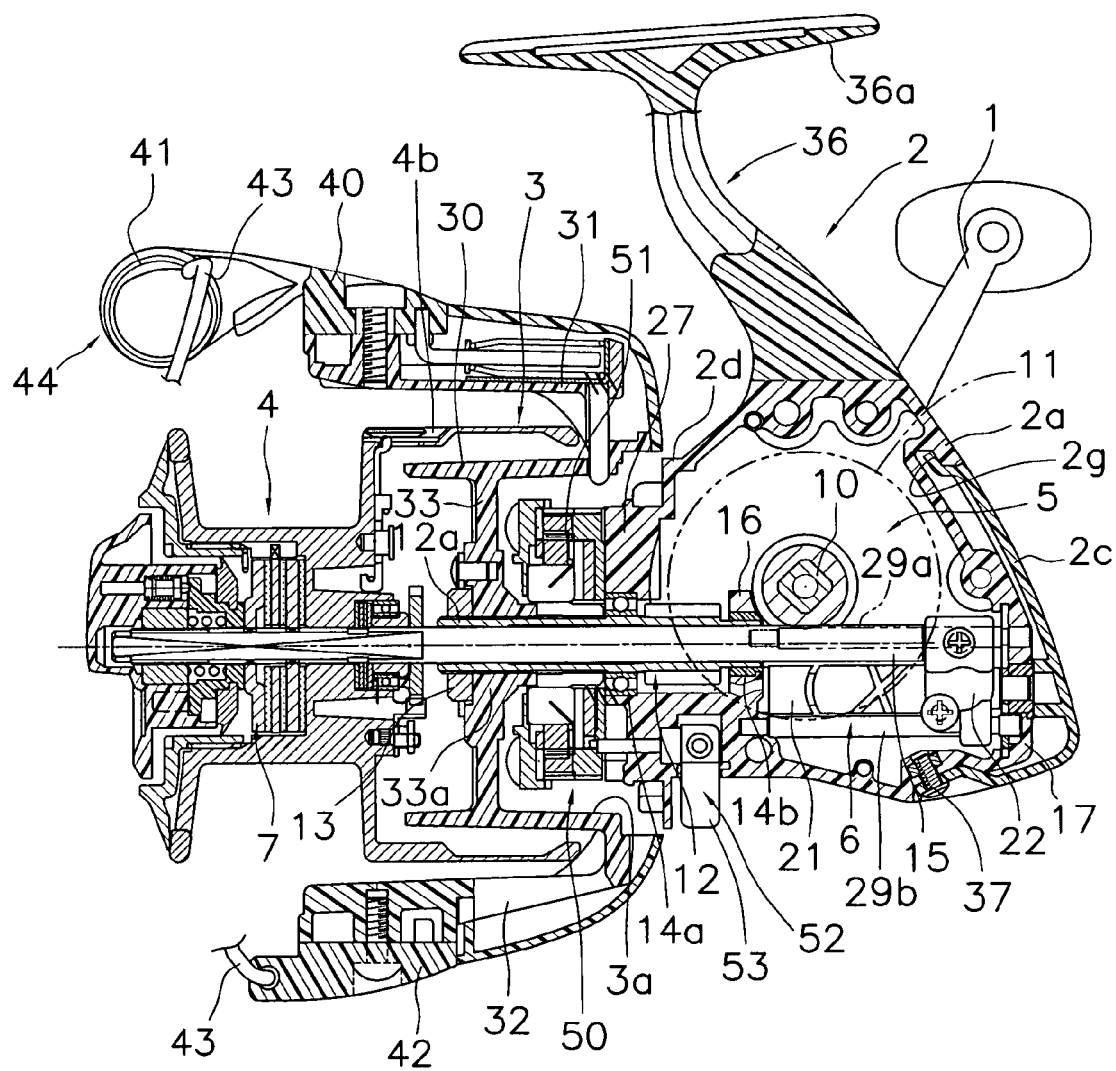
FIG. 2 is a side cross sectional view of the spinning reel of FIG. 1 in accordance with the first embodiment of the present invention.
Figure 3:
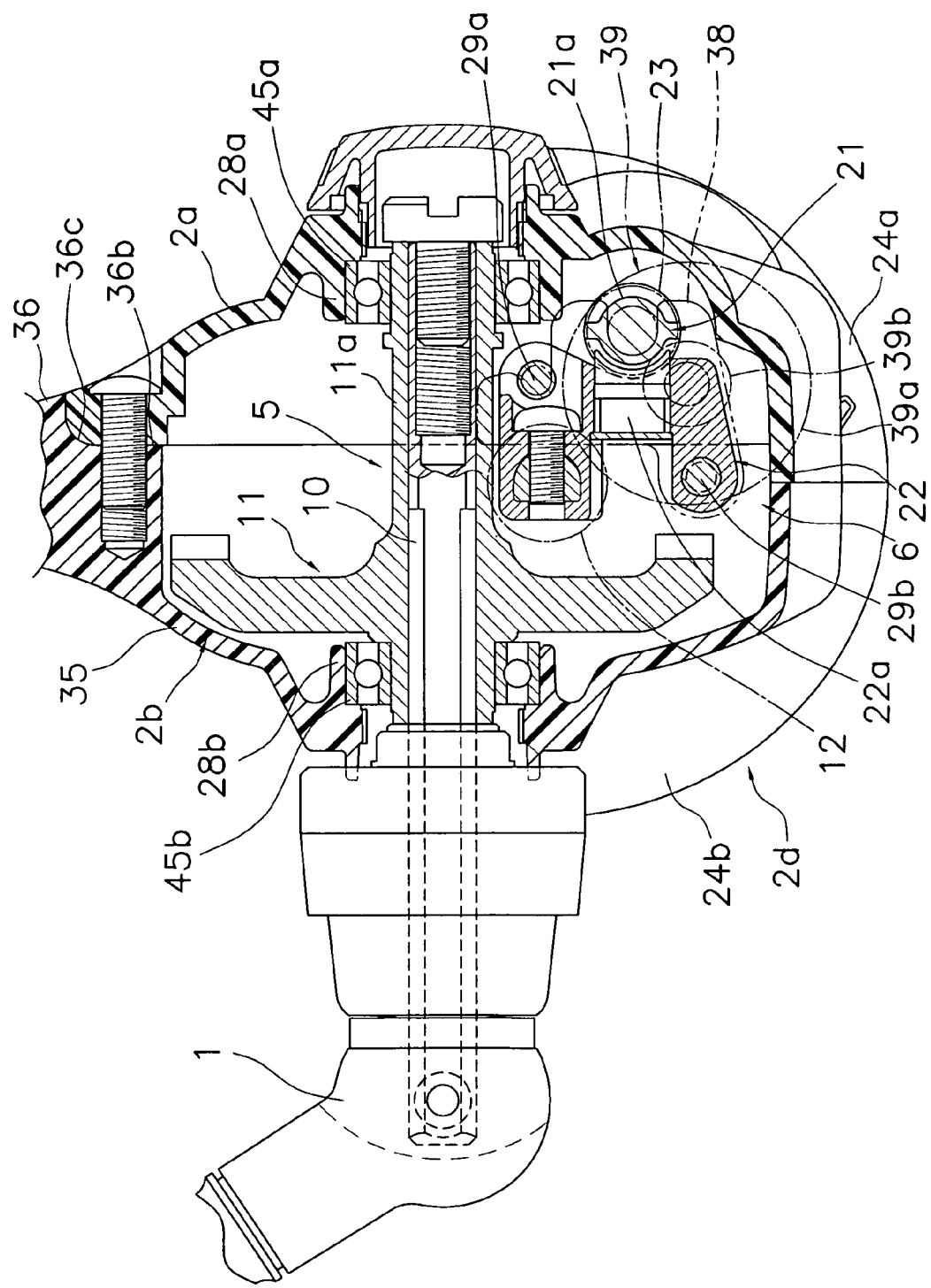
FIG. 3 is a partial rear cross sectional view of the spinning reel of FIG. 1 in accordance with the first embodiment of the present invention.

FIGS. 1 and 2 shows a spinning reel in accordance with a first embodiment of the present invention. The spinning reel includes a handle 1, a reel unit 2, a rotor 3, a spool 4, a rotation transfer mechanism 5, an oscillating mechanism 6, a drag mechanism 7 and a spool shaft 15. The reel unit 2 is mounted to a fishing rod (not shown). The handle 1 is rotably supported on the reel unit 2. The rotor 3 has a bail arm or fishing line guide part 44. The rotor 3 is mounted to a frontward portion of the reel unit 2 such that the rotor 3 freely rotates about a longitudinal axis. The longitudinal axis is oriented so as to be generally parallel to a center axis of the fishing rod. The fishing line, which is guided by the rotor 3 is wound onto an outside circumference of the spool 4. The spool 4 is arranged on a frontward portion of the rotor 3 such that the spool 4 freely moves along the longitudinal axis (hereinafter called "the longitudinal direction"). The spool shaft 15 is mounted to the reel unit 2 such that the spool shaft 15 freely moves along the longitudinal direction. The spool 4 is mounted on a frontward end of the spool shaft 15 with the drag mechanism 7 disposed between the spool 4 and the spool shaft 15. The rotation transfer mechanism 5 is configured and arranged to transfer a rotation of the handle 1 to the rotor 3. The oscillating mechanism 6 is configured to move the spool shaft 15 to and fro along the longitudinal direction in response to a rotation of the rotation transfer mechanism 5. The oscillating mechanism 6 enables the fishing line to be wound evenly onto the spool 4. The handle 1 is mounted to either a left side of the reel unit 2, as shown in FIGS. 1 and 3, or a right side of the reel unit 2, as shown in FIG. 2.

As shown in FIGS. 1–5, the reel unit 2 includes a reel body 2*a*, a lid member 2*b*, a cover member 2*c* and a circular flange 2*d*. The reel body 2*a* supports the rotor 3 and the spool 4. The lid member 2*b* is detachably fastened to the reel body 2*a* with screws. The cover member 2*c* covers rear portions of the reel body 2*a* and the lid member 2*b*. The flange 2*d* includes first and second flange sections 24*a* and 24*b*. The first and second flange sections 24*a* and 24*b* are formed integrally with frontward portions of the reel body 2*a* and the lid member 2*b*, respectively, so as to form the circular flange 2*d*.

Figure 5:
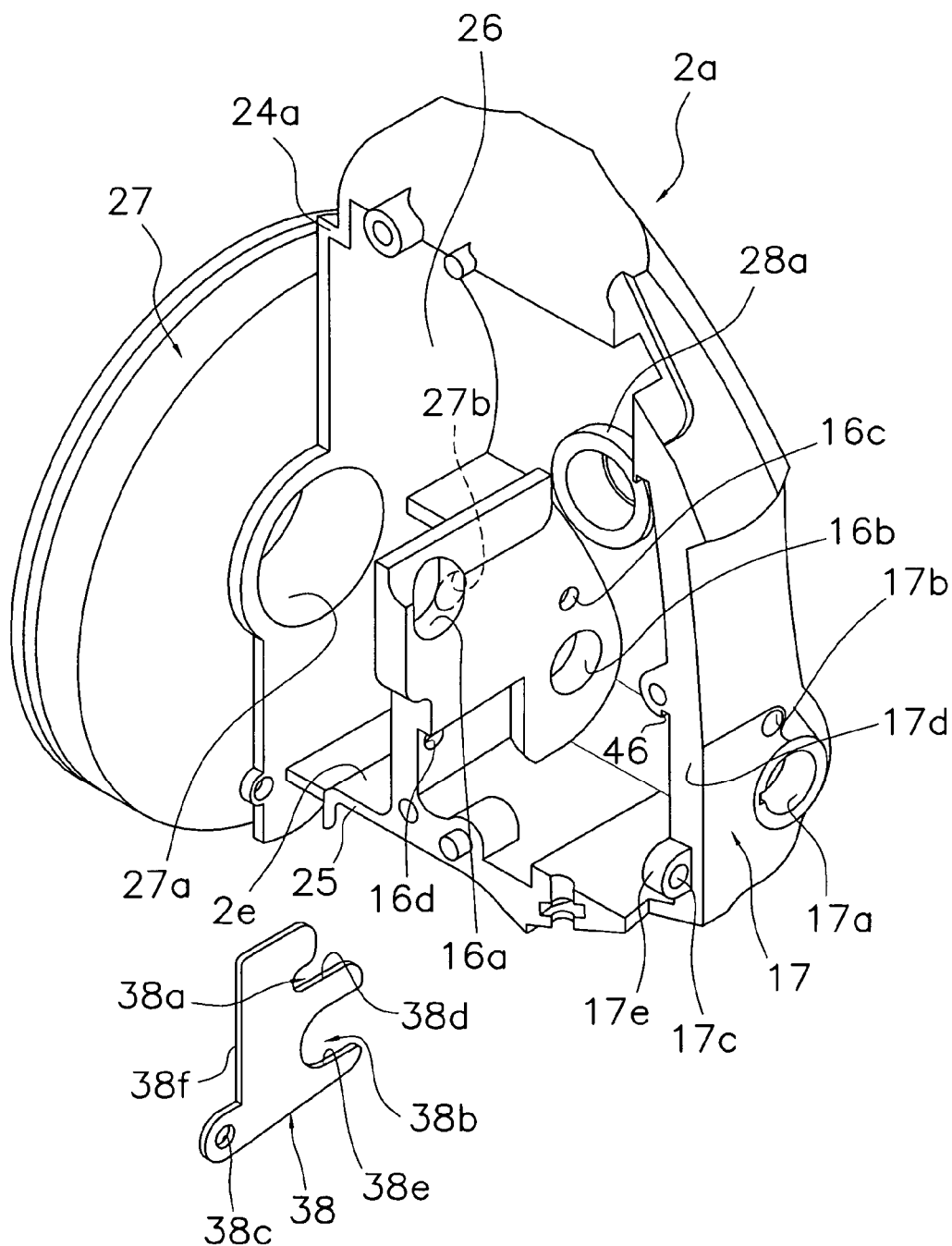
FIG. 5 is a partial perspective view of the reel unit of the spinning reel as shown in FIGS. 1 and 4 in accordance with the first embodiment of the present invention.

The reel body 2*a* is, for example, made of a polyamide-based synthetic resin reinforced with glass fiber and manufactured by injection molding. As shown in FIG. 5, the reel body 2*a* has an opening 25, a mechanism housing space 26, a front support wall 27 and a first handle support part 28*a*. The opening 25 is formed in a side portion of the reel body 2*a*. The mechanism housing space 26 is formed on an inside of the reel body 2*a*. The front support wall 27 rotably supports a rotary shaft of the rotor 3. The front support wall 27 is shaped to facilitate being disposed inside a circular depression 3*a* formed in a side of the rotor 3 that faces the reel body 2*a*. The first handle support part 28*a* has a boss and supports an end of a handle shaft 10 of the handle 1. An upper portion of the reel body 2*a*, specifically, a portion of the reel body 2*a* proximate to where the reel is mounted to the fishing rod, has a thickness that is less than one half of the total thickness of the reel unit 2. A lower portion 2*e* protrudes toward the lid member 2*b* and is approximately one half of the thickness of the reel unit 2.

The oscillating mechanism 6 includes a screw shaft 21, a slider 22, an intermediate gear 23, first and second guide shafts 29*a* and 29*b* and a retaining member 38. The screw shaft 21 is arranged parallel to the spool shaft 15. The slider is configured to move to and fro along the screw shaft 21. The intermediate gear 23 is fastened to the tip end of the screw shaft 21. The first and second guide shafts 29*a* and 29*b* guide the slider 22 along the longitudinal direction.

Figure 6:
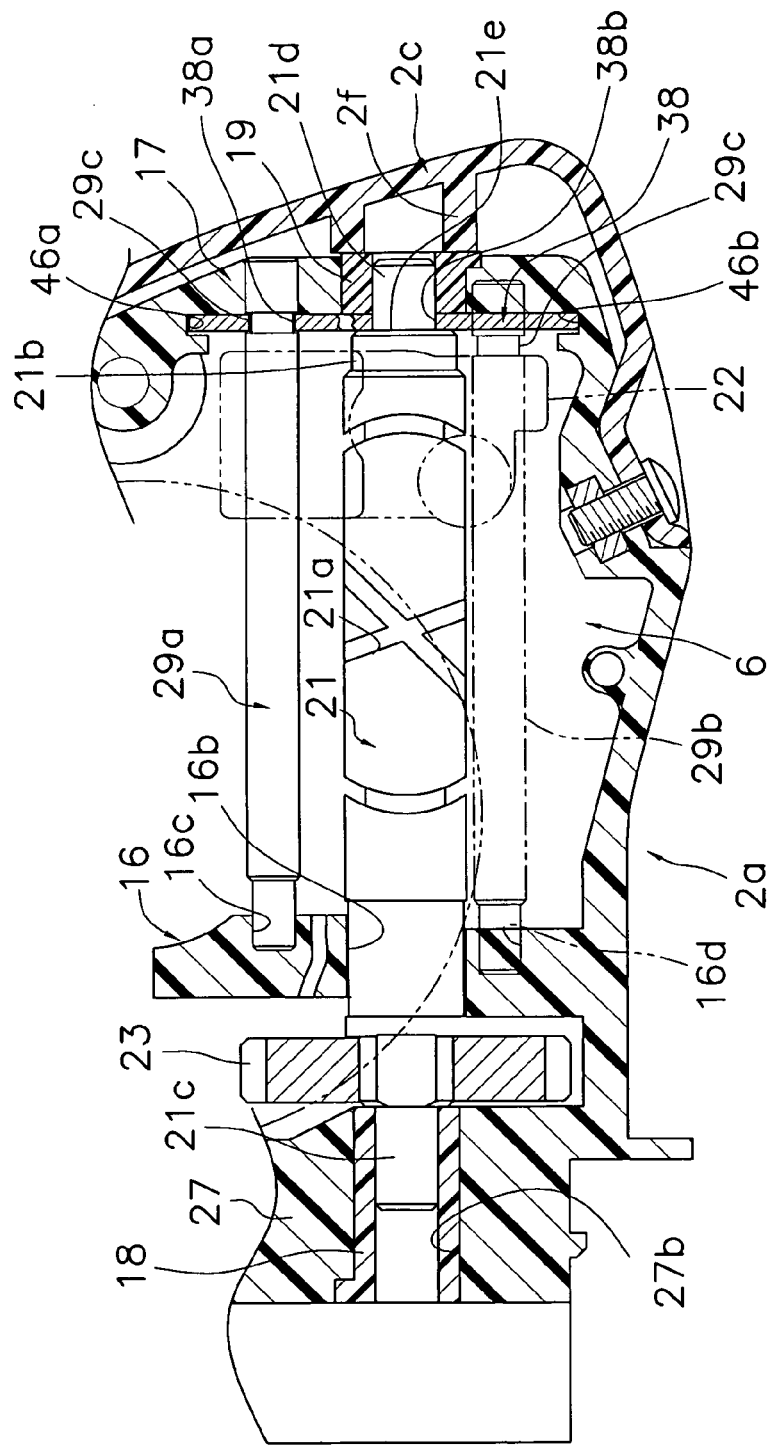
FIG. 6 is a partial cross sectional view of the reel unit of the spinning reel as shown in FIGS. 1 and 4 in accordance with the first embodiment of the present invention.

Referring to FIGS. 2 and 6, the screw shaft 21 is arranged diagonally below a rearward end of the spool shaft 15. The screw shaft 21 has an intersecting helical groove 21*a*, a large diameter section 21*b*, a frontward end small diameter section 21*c* and a rearward end small diameter section 21*d*. The intersecting helical groove 21*a* is formed in a surface of the screw shaft 21. The frontward end small diameter section 21*c* and the rearward end small diameter section 21*d* have smaller diameters than a portion of the screw shaft 21 where the helical groove 21*a* is formed. The frontward end small diameter section 21*c* and the rearward end small diameter section 21*d* are each provided on an end of the portion of the screw shaft 21 where the helical groove 21*a* is formed.

As shown in FIG. 2, the rotation transfer mechanism 5 and the oscillating mechanism 6 are arranged in the mechanism housing space 26. The front support wall 27 is generally shaped like a solid circular column. The front flange 24a is generally semicircular and formed integrally with a frontward portion of the reel body 2a in front of the mechanism housing space 26. The front support wall 27 is formed integrally with the first flange section 24a. The front support wall 27 protrudes in the forward direction. The front support wall 27 has a through hole 27a and a shaft mounting hole 27b. The through hole 27a is configured and arranged to allow a pinion gear 12 to pass therethrough. The through hole 27a is formed in a center of the front support wall 27. The screw shaft mounting hole 27b is formed in a lower portion of the inside (rearwardly facing side) of the front support wall 27 and configured to rotably support the screw shaft 21 to restrict forward movement of the screw shaft 21. A cylindrical first bushing 18 made of synthetic resin and configured to rotatably support a frontward end small diameter section 21c of the screw shaft 21 is installed in the screw shaft mounting hole 27b in such a fashion that forward movement thereof is restricted. Forward movement of the screw shaft 21 is restricted because the frontward end small diameter section 21c of the screw shaft 21 contacts the end face of the first bushing 18.

As shown in FIGS. 5 and 6, the reel body 2a also has an intermediate support wall 16 and a rear support wall 17. The intermediate support wall 16 is provided in an intermediate position along the longitudinal direction. The rear support wall 17 is provided at the rearward end of the reel body 2a. The intermediate support wall 16 is spaced away from a rear side of the front support wall 27. The intermediate support wall 16 extends upward from the bottom part 2e of the reel body 2a to an approximately middle portion. The intermediate support wall 16 has a first shaft support part 16a, a through hole 16b and second and third shaft support parts 16c and 16d. The first shaft support part 16a is configured and arranged to support a rearward end section of the pinion gear 12. The through hole 16b is configured and arranged for the screw shaft 21 to pass through. The second and third shaft support parts 16c and 16d are configured and arranged to support the first and second guide shafts 29a and 29b in such a manner that forward movement of the first and second guide shafts 29a and 29b is restricted. The first shaft support part 16a is formed in an upper portion (near a tip) of the intermediate support wall 16. The first shaft support part 16a passes through the intermediate support wall 16 in the longitudinal direction. The through hole 16b is formed in a position diagonally downward from the first shaft support part 16a. The through hole 16b passes through the intermediate support wall 16 in the longitudinal direction. The through hole 16b is arranged to be coaxial with the screw shaft mounting hole 27b. The second shaft support part 16c is positioned above the through hole 16b. The second shaft support part 16c is formed as a hole that does not penetrate the intermediate support wall 16. The third shaft support part 16d is positioned below the first shaft support part 16a and formed as a hole that does not penetrate the intermediate support wall 16.

The rear support wall 17 is provided on a rearward end portion of the reel body 2a so as to form the mechanism housing space 26. The rear support wall 17 has a first rearward end support part 17a, a second rearward end support part 17b, a third rearward end support part 17c, a side part 17d and a protruding part 17e. The second and third rearward end support parts 17b and 17c support rearward end sections of the first and second guide shafts 29a and 29b.

The first rearward end support part 17a supports a rearward end section of the screw shaft 21. A cylindrical second bushing 19 is made of synthetic resin and is configured to rotatably support a rearward end small diameter section 21d of the screw shaft 21. The second bushing 19 is installed in the first rearward end support part 17a in such a fashion that rearward movement thereof is restricted. More specifically, rearward movement of the second bushing 19 is restricted by a cylindrical protruding part 2f formed on an inside surface of the cover member 2c, which is mounted to the rear of the rear support wall 17. Thus, since the second bushing 19, which serves as a bearing for rotatably supporting the screw shaft 21, is retained by the cover member 2c, the retainment of the bushing 19 is accomplished with a simple structure.

The first rearward end support part 17a is configured to pass through the rear support wall 17 in the longitudinal direction. The first rearward end support part 17a is coaxial with the through hole 16b of the intermediate support wall 16. The second and third rear support parts 17b and 17c are configured to pass through the rear support wall 17 in the longitudinal direction and arranged to be coaxial with the first and second shaft support parts 16c and 16d of the intermediate support wall 16. The third rearward end support part 17c is formed in the protruding part 17e. The protruding part 17e is provided on the side part 17d of the rear support wall 17. The protruding part 17e has a smaller thickness than the rest of the rear support wall 17 and is countersunk from the rearward side of the rear support wall 17 so as to be positioned toward the frontward side thereof.

Figure 4:
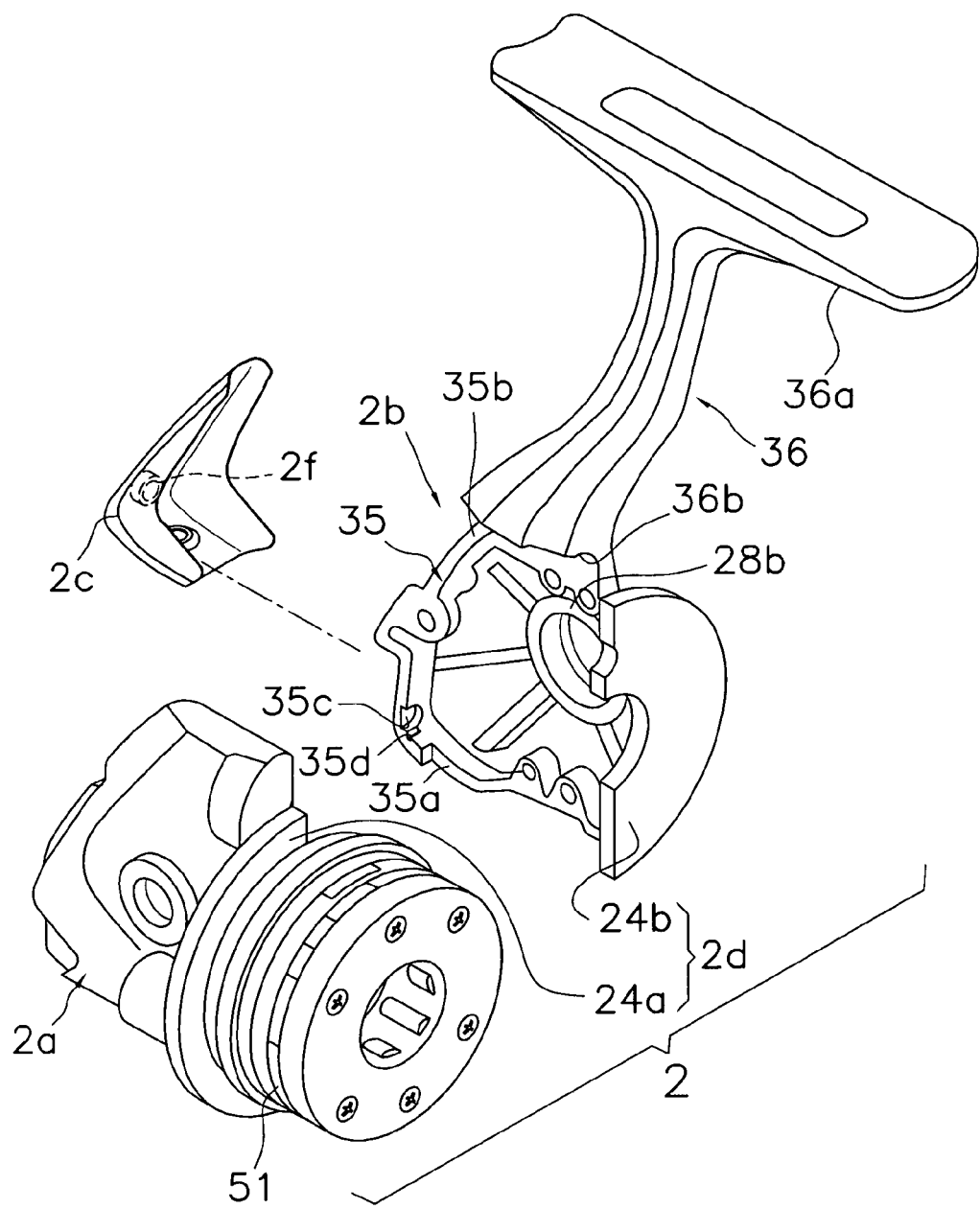
FIG. 4 is an exploded perspective view of a reel unit of the spinning reel of FIG. 1 in accordance with the first embodiment of the present invention.

The lid member 2b is, for example, made of a polyamide-based synthetic resin reinforced with glass fiber and manufactured by injection molding. As shown in FIGS. 3 and 4, the lid member 2b has a thin-walled cover section 35 and a mounting leg section 36. The mounting leg section 36 extends upward from the cover section 35. The cover section 35 is configured to cover the opening 25 of the reel body 2a, and the second flange section 24b (which serves as a wall) is formed integrally with the cover section 35 such that a space is formed inside the cover section 35. The thickness of the upper portion of the cover section 35 is less than one half the total thickness of the reel unit 2. The cover section 35 has a bottom portion 35a, a rim part 35b, a cover recess 35c and a cover section interlock groove 35d. The bottom portion 35a protrudes toward the reel body 2a and is approximately one half the thickness of the reel unit 2. The rim part 35b is provided on upper and rearward portions of the cover section 35. The rim part 35b is faces toward the opening 25. The rim part 35b is not provided on a frontward portion of the cover section 35. The rim part 35b is formed to have a step-like contour configured such that the rim part 35b mates closely with the opening 25. The semicircular second flange section 24b of the flange 2d is formed on the forward portion of the cover section 35. An inwardly protruding inside portion of the second flange section 24b functions as a wall that reinforces the cover section 35. A second handle support part 28b with a boss supports another end of the handle shaft 10. The second handle support part 28b is formed on a side portion of the cover section 35. The cover recess or third movement restricting part 35c is formed in a rearward portion of the cover section 35. The cover recess 35c is configured and arranged to engage with and cover the countersunk protruding part 17e of the rear support wall 17 of the reel body 2a from the rear. The cover recess 35c restricts rearward movement of the second guide shaft 29b.

The mounting leg section 36 is a thick-walled member on a tip end of the lid member 2b. The mounting leg section 36 has a fishing rod mounting part 36a, an overlap portion 36b and a curved portion 36c. The fishing rod mounting part 36a extends both forward and rearward in the longitudinal direction. The overlap portion 36b has a thickness of less than approximately one half of the thickness of the lid member 2b. The overlap portion 36b overlaps a boundary between the mounting leg section 36 and the cover section 35. An upper portion of the reel body 2a fits into the overlap portion 36b such that outside surfaces of the reel body 2a and the lid member 2b blend smoothly together. Referring to FIG. 3, the curved portion 36c where the overlap portion 36b joins with the rim part 35b has a curved surface with a radius of curvature of, for example, approximately 3 mm in order to prevent stress concentration from occurring.

Referring to FIGS. 2 and 4, the flange 2d is shaped like a circular disk. The flange 2d is disposed in approximately the same plane as a rearward edge of the circular depression 3a formed in the rearward side of the rotor 3, thereby generally obstructing the depression 3a. The generally semicircular first flange section 24a is formed integrally with the reel body 2a. The generally semicircular second flange section 24b is formed integrally with the cover section 35 of the lid member 2b. Together, the first and second flange sections 24a and 24b form a circular shape. By integrally forming the first and second flange sections 24a and 24b, deformation is prevented during the forming process. Thus, the specific strengths and the precision of the reel body 2a and the cover section 35 are maintained at a high level.

The cover member 2c is made of a scratch resistant material, such as a stainless steel alloy or an ABS resin or other synthetic resin treated with a scratch resistant coating. The cover member 2c protects portions of the reel unit 2 that are most susceptible to scratching. A lower end portion of the cover member 2c is fastened with a screw 37 and an upper end portion is elastically interlocked with the reel body 2a. More specifically, as shown in FIG. 2, the upper end portion is hooked into an interlock recess 2g formed on the inside of the back surface of the reel body 2a. The cylindrical protruding part 2f is formed on an inside surface of the cover member 2c and arranged such that it protrudes forward.

Referring to FIGS. 2, 3 and 6, the first guide shaft 29a and the screw shaft 21 of the oscillating mechanism 6 are mounted in the reel body 2a such that forward movement thereof is restricted. The retaining member 38 restricts rearward movement of the first guide shaft 29a and the screw shaft 21. Specifically, first and second movement restricting parts 38a and 38b of the retaining member 38 restrict the rearward movement of the first guide shaft 29a and the screw shaft 21. Rearward movement of the second guide shaft 29b is restricted by the cover recess 35c of the lid member 2b. Furthermore, since rearward movement of the retaining member 38 is restricted by the reel body 2a and the retaining member 38 is attached to the second guide shaft 29b to move freely in a pivot-like manner, there is no need to provide screws or other separate members to secure the retaining member 38 to the reel body 2a. Thus, the retaining member 38 will not become detached if the lid member 2b is removed. As a result, the size of the reel unit 2 is reduced while still securing the screw shaft 21 and the first and second guide shafts 29a and 29b in a retained position.

As shown in FIGS. 2 and 3, the rotation transfer mechanism 5 has a master gear 11 and a pinion gear 12. The pinion gear 12 meshes with the master gear 11. The master gear 11 includes a face gear arranged to rotate when the handle shaft 10 on which the handle 1 is fastened rotates. The master gear 11 has a master gear shaft 11a. The master gear shaft 11a is non-rotatably mounted to the handle shaft 10. As shown in FIG. 3, the master gear shaft 11a is supported in the reel body 2a and the lid member 2b on first and second bearings 45a and 45b. The master gear shaft 11a freely rotates about a transverse (left-to-right) axis that is skew with respect to the longitudinal axis. The first and second bearings 45a and 45b are installed inside first and second handle support parts 28a and 28b provided in the reel body 2a and the lid member 2b, respectively.

Referring to FIG. 2, the pinion gear 12 serves as the rotary shaft of the rotor 3 and is cylindrical in shape. A frontward section 12a of the pinion gear 12 passes through a center of the rotor 3 and is fastened to the rotor 3 with a nut 13. A third bearing 14a rotatably supports an intermediate portion of the pinion gear 12. A fourth bearing 14b rotatably supports a rearward portion of the pinion gear 12. The third bearing 14a is installed in the front support wall 27. The fourth bearing 14b is installed in the first shaft support part 16a of the intermediate support wall 16. The spool shaft 15 passes axially through the inside of the pinion gear 12.

The spool shaft 15 is connected to a center section of the spool 4. As shown in FIGS. 2, 3, and 6, the oscillating mechanism 6 is configured to move the spool shaft 15 in the longitudinal direction when the rotation transfer mechanism 5 rotates, thereby moving the spool 4 in the same longitudinal direction.

Referring to FIGS. 2 and 3, the slider 22 has an engaging member 22a inside that is configured to engage with the helical groove 21a such that the slider 22 moves reciprocally along the longitudinal direction when the screw shaft 21 rotates. The slider 22 is non-rotatably fastened to the rearward end of the spool shaft 15. The slider 22 is guided in the longitudinal direction by the first and second guide shafts 29a and 29b. By guiding the slider 22 with the first and second guide shafts 29a and 29b, the helical groove 21a is prevented from contacting the slider 22 and the occurrence of noise and vibration is suppressed.

The intermediate gear 23 rotates when the rotation transfer mechanism 5 rotates. More specifically, a reduction gear unit 39 is provided between the intermediate gear 23 and the pinion gear 12 of the rotation transfer mechanism 5. The reduction gear unit 39 has a large diameter gear 39a and a small diameter gear 39b. The large diameter gear 39a is arranged and configured to mesh with the pinion gear 12. The small diameter gear 39b is arranged to be coaxial with the large diameter gear 39a. The small diameter gear 39b meshes with the intermediate gear 23 and the rotation of the pinion gear 12 is transferred to the screw shaft 21. Consequently, the speed of the reciprocal motion of the oscillating mechanism 6 is reduced and the fishing line is precisely wound onto the spool 4.

Referring to FIGS. 2, 3 and 6, the first guide shaft 29a is arranged above the screw shaft 21. A rearward end section of the first guide shaft 29a is supported in the second rearward end support part 17b of the rear support wall 17. An annular guide shaft interlock groove 29c is provided on a rearward portion of the first guide shaft 29a. The guide shaft interlock groove 29c interlocks with the retaining member 38. Rearward movement of the first guide shaft 29a is restricted by the retaining member 38, which fits into the guide shaft interlock groove 29c.

The second guide shaft 29b is arranged below the spool shaft 15. A rearward end section of the second guide shaft 29b is supported in the third rearward end support part 17b of the rear support wall 17. Rearward movement of the second guide shaft 29b is restricted by the cover recess 35c formed in the lid member 2b. Although a guide shaft interlock groove 29c is provided in the second guide shaft 29b, the guide shaft interlock groove 29c is not used and is provided merely to enable a common guide shaft design to be used for both guide shafts 29a and 29b for ease of manufacture and cost reduction.

As shown in FIGS. 3 and 5, the retaining member 38 is a metal plate-like member. The retaining member 38 is mounted to the reel unit 2. Rearward movement of the retaining member 38 is restricted. More specifically, rearward movement of the retaining member 38 is restricted by the retaining member 38 contacting a front surface of the rear support wall 17. The retaining member 38 has first and second movement restricting parts 38a and 38b, a mounting hole 38c and a side face 38f. The second guide shaft 29b is pivotally mounted in the mounting hole 38c. The first movement restricting part 38a restricts rearward movement of the first guide shaft 29a. The side face 38f is located on a portion of the retaining member 38 where the first and second movement restricting parts 38a and 38b are not formed. The side face 38f is configured to be pressed against the lid member 2b. The retaining member 38 does not easily become loose because the retaining member 38 is pressed toward the reel body 2a by the lid member 2b. Thus, rearward ends of the first guide shaft 29a and the screw 21 shaft are restrained with good precision.

The first movement restricting part 38a has a first interlock notch 38d that is spaced apart from the mounting hole 38c. The first interlock notch 38d spans from an inside portion (right side in FIG. 3) of the retaining member 38 to a position located diagonally inward and upward from the mounting hole 38c. The first interlock notch 38d fits into the guide shaft interlock groove 29c of the guide shaft 29a to restrict rearward movement of the first guide shaft 29a. The second movement restricting part 38b has a second interlock notch 38e arranged generally between the mounting hole 38c and the first movement restricting part 38a. The second interlock notch 38e contacts an axially facing step surface 21e of the screw shaft 21. The step surface 21e is located between a large diameter section 21b where a helical groove 21a is formed and a rearward end small diameter section 21d. The second movement restricting part 38b restricts rearward movement of the screw shaft 21. As shown in FIGS. 4 and 6, first and second reel body interlock grooves 46a and 46b and the cover section interlock groove 35d engages the retaining member 38 such that the retaining member 38 cannot move in the longitudinal direction. The first and second reel body interlock grooves 46a and 46b are formed in portions of the reel body 2a. The cover section interlock groove 35d is formed in the lid member 2b where the retaining member 38 is attached. The first and second reel body interlock grooves 46a and 46b are formed vertically one over the other on the forward side of the rear support wall 17 of the reel body 2a. Thus, the retaining member 38 is not only pressed by the lid member 2b but also interlocked with the first ands second reel body interlock grooves 46a and 46b and the cover section interlock groove 35d, thereby making it even more difficult to become loose.

When installing the oscillating mechanism 6 into the reel unit 2, the slider 22 is first mounted to the rearward end of the spool shaft 15. The spool 4 is arranged in a rearward most position while attaching the slider 22. Then, with the intermediate gear 23 arranged in a prescribed position, the screw shaft 21 is inserted through the first rear support part 17a of the rear support wall 17 from the rear and passed through the intermediate gear 23 such that the frontward end small diameter section 21c is installed in the first bushing 18.

Once the screw shaft 21 is installed in the reel body 2a, the second bushing 19 is installed in the first rearward end support part 17a such that the rearward end small diameter section 21d of the screw shaft 21 is supported by the second bushing 19. Once the installation of the screw shaft 21 is completed, the first guide shaft 29a is inserted through the second rearward end support part 17b from the rear. Then, the first guide shaft 29a is passed through the slider 22 and the frontward end thereof is inserted into the second shaft support part 16c of the intermediate support wall 16, thereby completing the installation of the first guide shaft 29a into the reel body 2a. Next, the retaining member 38 is mounted to the front face of the rear support wall 17 formed in the reel body 2a and secured with the interlock grooves 29c. More specifically, the first movement restricting part 38a of the retaining member 38 is fitted into the first guide shaft interlock groove 29c of the first guide shaft 29a, thereby restricting rearward movement of the first guide shaft 29a. Meanwhile, the second movement restricting part 38b is put in contact with the axially facing step surface 21e of the screw shaft 21, thereby restricting rearward movement of the screw shaft 21.

Finally, the second guide shaft 29b is inserted through the third rearward end support part 17c from the rear. The second guide shaft 29b is passed through the mounting hole 38c of the retaining member 38 and through the slider 22. The tip end of the second guide shaft 29b is inserted into the third shaft support part 16d of the intermediate support wall 16 to complete the installation of the second guide shaft 29b into the reel body 2a. In this state, rearward movement of the second guide shaft 29b and the second bushing 19 is not restricted. However, when the lid member 2b is mounted to the reel body 2a, the cover recess 35c formed in the lid member 2b restricts rearward movement of the second guide shaft 29b. When the cover member 2c is mounted to the reel unit 2, rearward movement of the second bushing 19 is restricted because the protruding part 2f contacts the rear surface of the second bushing 19.

Since rearward movement of the retaining member 38 is restricted by the reel body 2a and the retaining member 38 is attached to the second guide shaft 29b in such a fashion that it can move freely in a pivot-like manner, there is no need to provide screws or other separate members to secure the retaining member 38 to the reel body 2a. In addition, the retaining member 38 will not become detached even if the lid member 2b is removed. As a result, the size of the reel unit 2 is reduced while still securing the screw shaft 21 and the first and second guide shafts 29a and 29b.

As shown in FIG. 2, the rotor 3 has a circular cylindrical part 30 and first and second rotor arms 31 and 32 arranged on opposite sides of the cylindrical section 30. The cylindrical part 30 and the first and second rotor arms 31 and 32 are formed as a one-piece unitary member.

A front wall 33 is provided on a frontward portion of the cylindrical part 30. A center portion of the front wall 33 forms a boss 33a. The frontward section 12a of the pinion gear 12 and the spool shaft 15 pass through a through hole of the boss 33a. The nut 13 is arranged on a frontward side of the front wall 33. The nut 13 screws onto a threaded section on a tip end of the pinion gear 12. A portion of the cylindrical part 30 located rearward of the front wall 33 forms the circular depression 3a. The flange 2d is formed integrally with the reel body 2a and the lid member 2b. The flange 2d is arranged flat against the rearward end face of the circular depression 3a so as to share the same plane.

A bail arm 44 includes first and second bail support members 40 and 42, a line roller 41 and a bail 43. The first bail support member 40 is mounted to an outside circumference of a tip end of the first rotor arm 31 such that the first bail support member 40 freely moves in a pivot-like manner. The line roller 41 guides the fishing line onto the spool 4. The line roller 41 is mounted to a tip end of the first bail support member 40. The second bail support member 42 is mounted to an outside circumference of a tip end of the second rotor arm 32 such that the second bail support member 42 freely moves in a pivot-like manner. The bail 43 is provided between the line roller 41 on the tip end of the first bail support member 40 and the second bail support member 42.

A reverse rotation check mechanism 50 of the rotor 3 is arranged inside the cylindrical part 30 of the rotor 3. The reverse rotation check mechanism 50 includes a roller-type one-way clutch 51 and a switching mechanism 52. The switching mechanism 52 is configured to switch the one-way clutch 51 between an operational state and a non-operational state. An outer race of the one-way clutch 51 is fastened to the front surface of the front support wall 27. An inner race of the one-way clutch 51 is non-rotatably engaged with the pinion gear 12. Forward movement of the first bushing 18 is restricted by the one-way clutch 51. The switching mechanism 52 has a switching lever 53 arranged between the reel body 2a and the lid member 2b on the frontward end of a bottom portion of the reel unit 2. The one-way clutch 51 is switched between the operational state and the non-operational state by pivoting the switching lever 53. When the one-way clutch 51 is in the operational state the rotor 3 cannot rotate in the reverse direction. When the one-way clutch 51 is in the non-operational state the rotor 3 is able to rotate in the reverse direction.

Figure 7:
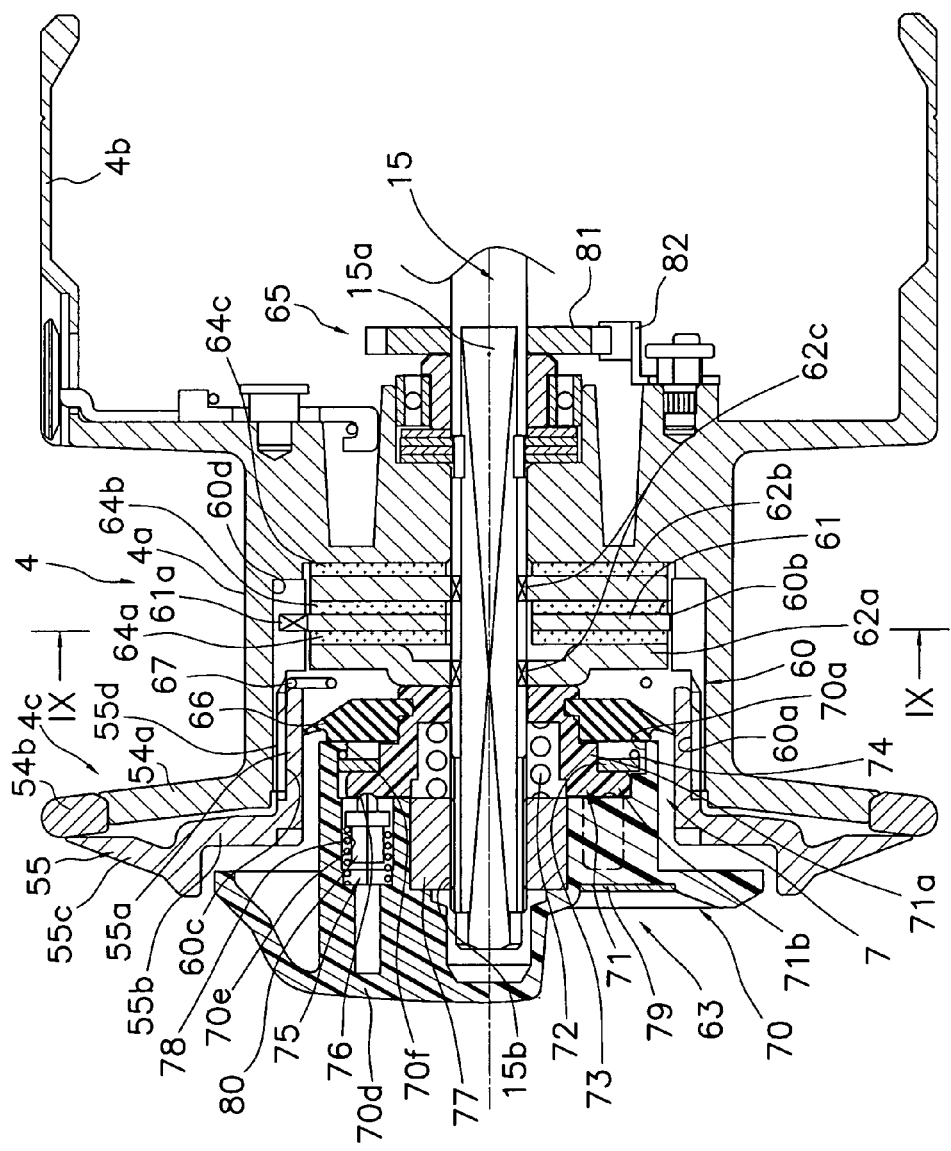
FIG. 7 is a cross sectional view of a spool of the spinning reel of FIG. 1 with the spinning reel drag mechanism in accordance with the first embodiment of the present invention.

The spool 4 is made of, for example, an aluminum alloy. The spool 4 is arranged between the first rotor arm 31 and the second rotor arm 32 of the rotor 3. The spool 4 is mounted to the frontward end of the spool shaft 15 with the drag mechanism 7 interposed between the spool 4 and the spool shaft 15. As shown in FIG. 7, the spool 4 includes a tubular bobbin trunk 4a, a larger diameter tubular skirt 4b and a front flange 4c. The fishing line is wound around an outside circumference of the bobbin trunk 4a. The tubular skirt 4b is integrally formed with the rearward end of the bobbin trunk 4a. The front flange 4c is arranged on a frontward end of the bobbin trunk 4a.

Figure 8:
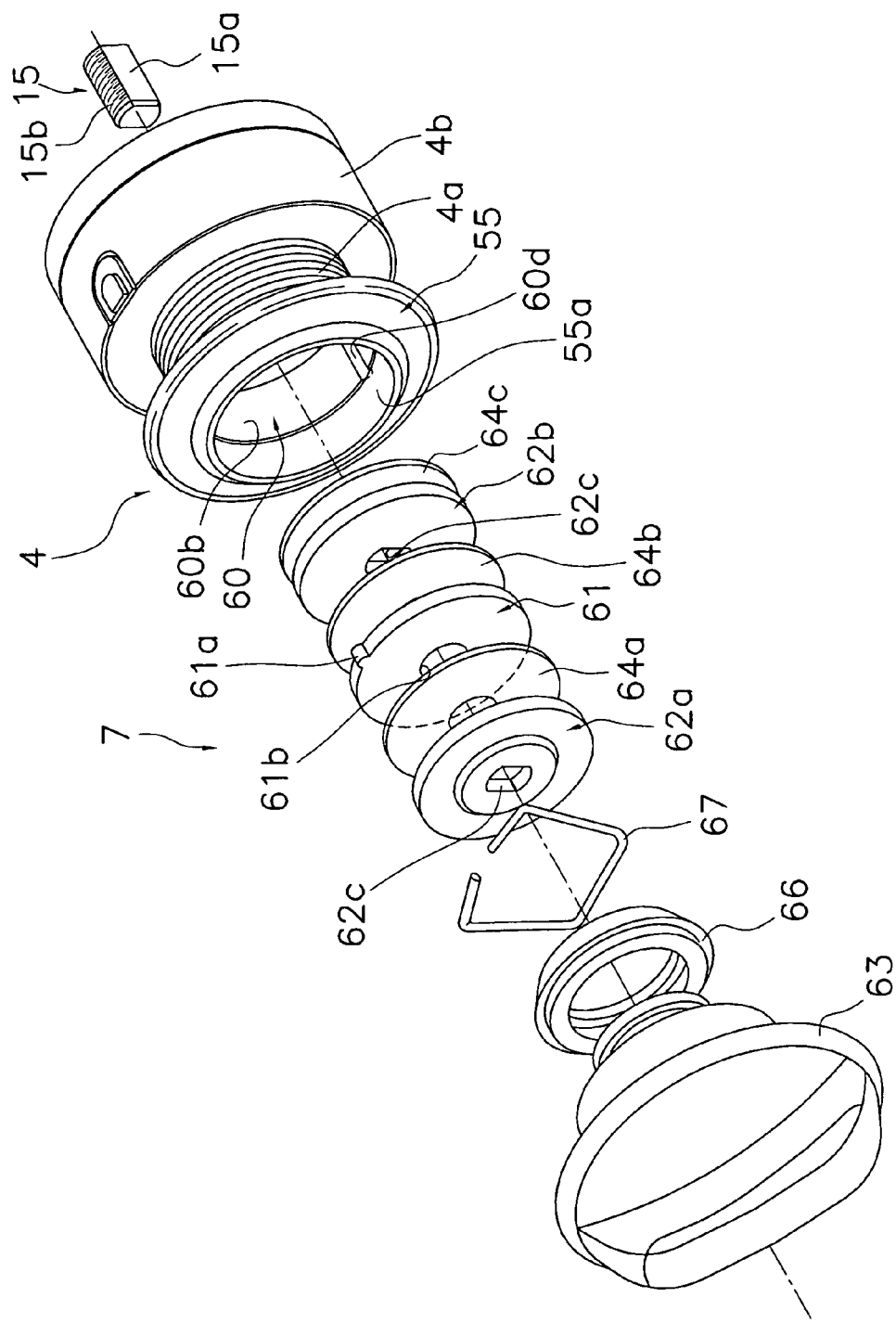
FIG. 8 is an exploded perspective view of the spool of FIG. 7 in accordance with the first embodiment of the present invention.
Figure 9:
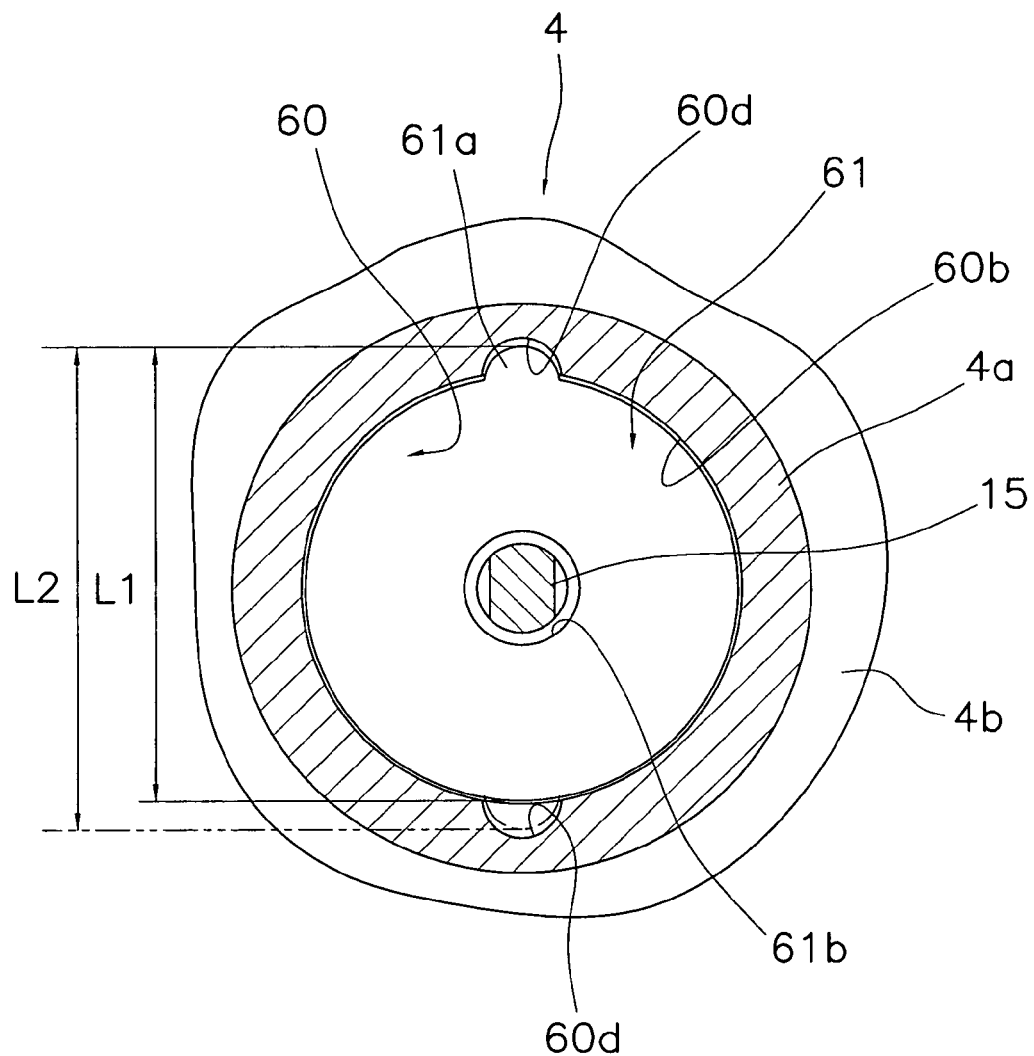
FIG. 9 is a partial cross sectional view of the spool taken along section line IX—IX of FIG. 7 in accordance with the first embodiment of the present invention.

Referring to FIGS. 2 and 7–9, a circular drag housing recess 60 that opens in the frontward direction is formed in the bobbin trunk 4a. The drag housing recess 60 has a frontward portion 60a, a rearward portion 60b, an internally threaded section 60c and first and second interlock grooves 60d. The frontward portion 60a has a larger diameter than the rearward portion 60b. The internally threaded section 60c, into which a flange fastening member 55 is screwed, is formed in the frontward portion 60a. Referring to FIGS. 7 and 9, the first and second interlock grooves 60d prevent rotation of the drag mechanism 7. The first and second interlock grooves 60d are provided on an internal surface of the drag housing recess 60. The first ands second interlock grooves 60d span from the frontward portion 60a to the rearward portion 60b. The first and second interlock grooves 60d are arranged on diametrically opposite sides of the drag housing recess 60. The first and second interlock grooves 60d extend along the longitudinal direction of the spool 4.

Referring to FIG. 7, the front flange 4c has an inside part 54a and a ring-shaped outside part 54b. The inside part 54a is integrally formed with the bobbin trunk 4a. The outside part 54b is detachably mounted to the inside part 54a. The outside part 54b is made of, for example, a hard ceramic material. The outside part 54b is fastened to the inside part 54a by a flange fastening member 55. The flange fastening member 55 is screw-fastened into an internal surface of the bobbin trunk 4a.

The flange fastening member 55 has a tubular section 55a, a large diameter brim section 55b, a generally dish-shaped contact section 55c and an externally threaded section 55d. The externally threaded section 55d is formed on an external portion of the tubular section 55a. The externally threaded section 55d mates with the internally threaded section 60c formed in the frontward portion 60a of the drag housing recess 60. The brim section 55b is integrally formed with a frontward end of the tubular section 55a. The contact section 55c extends forward from the brim section 55b and contacts the frontward surface of the outside part 54b. An internal diameter of the tubular section 55a is the same as an internal diameter of the rearward portion 60b of the drag housing recess 60. Consequently, the internal diameter of the drag housing recess 60 is larger than in a conventional spool.

As shown in FIGS. 2, 7 and 9, the drag mechanism 7 is arranged between the spool 4 and the spool shaft 15, i.e., inside the drag housing recess 60. The drag mechanism 7 applies a drag force on the spool 4 by braking rotation of the spool 4 in the direction of reeling out (dispensing) the fishing line. Referring to FIGS. 7–9, the drag mechanism 7 has a first drag washer 61, two second drag washers 62a and 62b, a drag adjusting knob 63, three drag disks 64a, 64b and 64c, a first sound generating mechanism 65 and a seal member 66. The first drag washer 61 is rotatably mounted to the spool shaft 15. The second drag washers 62a and 62b are non-rotatably mounted to the spool shaft 15. The second drag washers 62a and 62b are arranged on opposite sides of the first drag washer 61. The drag adjusting knob 63 screws onto the spool shaft 15. The drag adjusting knob 63 adjusts an amount of pressure on the first and second drag washers 61, 62a and 62b. The drag disks 64a, 64b and 64c are arranged between the first and second drag washers 61, 62a and 62b and between the second drag washer 62b and the bottom portion of the drag housing recess 60. The drag disks 64a, 64b and 64c contact the first and second drag washers 61, 62a and 62b. The first sound generating mechanism 65 is configured to emit a sound when the drag mechanism 7 operates. The seal member 66 is arranged between the drag adjusting knob 63 and the flange fastening member 55.

The first drag washer 61 is a circular, disk-shaped member made of stainless steel or other metal. The first drag washer 61 has an internal diameter that is smaller than the internal diameter of the tubular section 55a of the flange fastening member 55. The external diameter of the first drag washer 61 is preferably from about 95% to 99% of the internal diameter of the drag housing recess 60. If the external diameter of the first drag washer 61 exceeds about 99% of the internal diameter of the drag housing recess 60, it will be difficult to house the first drag washer 61 in the drag housing recess 60. If the external diameter of the first drag washer 61 is less than about 95% of the internal diameter of the drag housing recess 60, the drag diameter will be too small and it will be difficult to obtain a large drag force.

As shown in FIGS. 7 and 9, the first drag washer 61 has an interlock protrusion 61a and a circular hole 61b. The circular hole 61b is arranged in a center portion of the first drag washer 61. The circular hole 61b allows the spool shaft 15 to pass therethrough. The interlock protrusion 61a is provided on an outside circumference of the first drag washer 61. The interlock protrusion 61a engages with one of the first and second interlock grooves 60d. The first drag washer is non-rotatable with respect to the spool 4 when the first drag washer 61 is installed in the drag housing recess 60. The amount by which the interlock protruding part 61a protrudes is preferably from about 5% to 10% of the outer diameter of the first drag washer 61. If the amount of protrusion is less than about 5% of the outer diameter of the first drag washer 61, an interlocking force sufficient to resist the drag force will not be obtainable. Conversely, if the amount of protrusion is larger than about 10% of the outer diameter of the first drag washer 61, it will be difficult to pass the first drag washer 61 through the tubular section 55a in order to install the first drag washer 61.

As shown in FIGS. 7 and 8, each of the second drag washers 62a and 62b is a circular disk-shaped member made of stainless steel or other metal. Each of the second drag washers 62a and 62b has an internal diameter that is smaller than the internal diameter of the tubular section 55a of the flange fastening member 55. The second drag washer 62a is shaped like a circular disk having a stepped portion that protrudes in the frontward direction. The second drag washer 62a is arranged in front of the first drag washer 61 with the drag disk 64a interposed therebetween. The second drag washer 62b is arranged to the rear of the first drag washer 61 with the drag disk 64b interposed there-between. The drag disk 64c is arranged between the second drag washer 62b and the bottom surface of the drag housing recess 60. An oval interlock hole 62c is provided at the center of each second drag washer 62a and 62b. The oval interlock hole 62c is configured to non-rotatably engage with parallel axially chamfered sections 15a formed on the frontward end of the spool shaft 15. The engagement of the interlock holes 62c with the chamfered sections 15a of the spool shaft 15 prevents the second drag washers 62a and 62b from rotating with respect to the spool shaft 15.

The drag disks 64a, 64b and 64c are disk-shaped members made of, for example, felt. The drag disks 64a, 64b and 64c are provided in order to make the first and second drag washers 61, 62a and 62b slide smoothly.

A retaining spring or retaining mechanism 67 is installed between the second drag washer 62a and the rearward end face of the tubular section 55a of the flange fastening member 55. More specifically, the retaining spring 67 is disposed between the rearward end face of the tubular section 55a and the axially facing step surface that exists between the frontward portion 60a and the rearward portion 60b of the drag housing recess 60. The retaining spring 67 prevents the first and second drag washers 61, 62a and 62b from falling out of place when the spool 4 is being attached or removed. As shown in FIG. 8, the retaining spring 67 is made of an elastic metal wire material that has been bent into shape. The retaining spring 67 has corner parts that are engaged between the rearward end face of the tubular section 55a and the axially facing step surface of the drag housing recess 60. The joining sections located between the corners of the retaining spring 67 are in contact with the second drag washer 62a, thereby preventing the second drag washer 62a from falling out of place.

Figure 11:
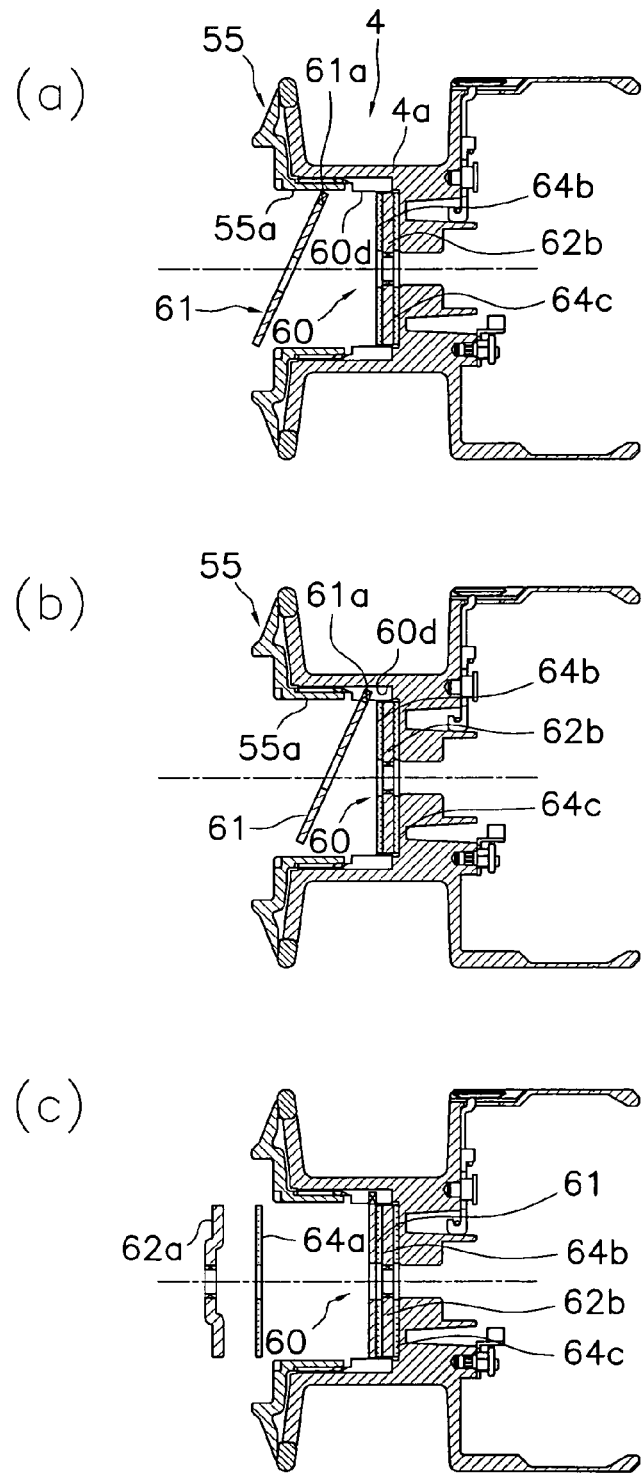
FIGS. 11(*a*)–11(*c*) are a series of cross sectional views of the spool illustrating the method of installing drag washers of the spinning reel drag mechanism in accordance with the first embodiment of the present invention.

FIG. 11(a) shows a state in which the flange fastening member 55 is already installed into the internal surface of the bobbin trunk 4a. In assembling the single first drag washer 61 between the two second drag washers 62a and 62b, the drag disk 64c, the second drag washer 62b and the drag disk 64b are installed into the drag housing recess 60 in the order listed. Next, the first drag washer 61 is oriented such that the interlock protrusion 61a is aligned with one of the interlock grooves 60d and tilted such that the interlock protrusion 61a is positioned farther rearward than the rest of the first drag washer 61 (i.e., the interlock protrusion 60d enters the housing recess 60 first). The first drag washer 61 is then passed through the inside of the tubular section 55a.

As shown in FIG. 11(b), once the interlock protrusion 60d has passed beyond the tubular section 55a, the first drag washer 61 is shifted toward the interlock groove 60d such that the interlock protrusion 60d engages with the interlock groove 60d. This shifting of the first drag washer 61 allows the external circumferential surface of the opposite side of the first drag washer 61 to clear the inside surface of the tubular section 55a. As shown in FIG. 11(c), the shifting of the first drag washer 61 allows the external circumferential surface to be swung about a rotational center located at the interlock protrusion 61a such that the first drag washer 61 comes into contact with the drag disk 64b. Then, the drag disk 64a and the second drag washer 62a are installed in the order listed and the retaining spring 67 is installed to complete the installation of the first and second drag washers 61, 62a and 62b. Finally, after the first and second drag washers 61, 62a and 62b have been installed, the drag adjusting knob 63 is installed to complete the assembly of the drag mechanism 7.

Figure 10:
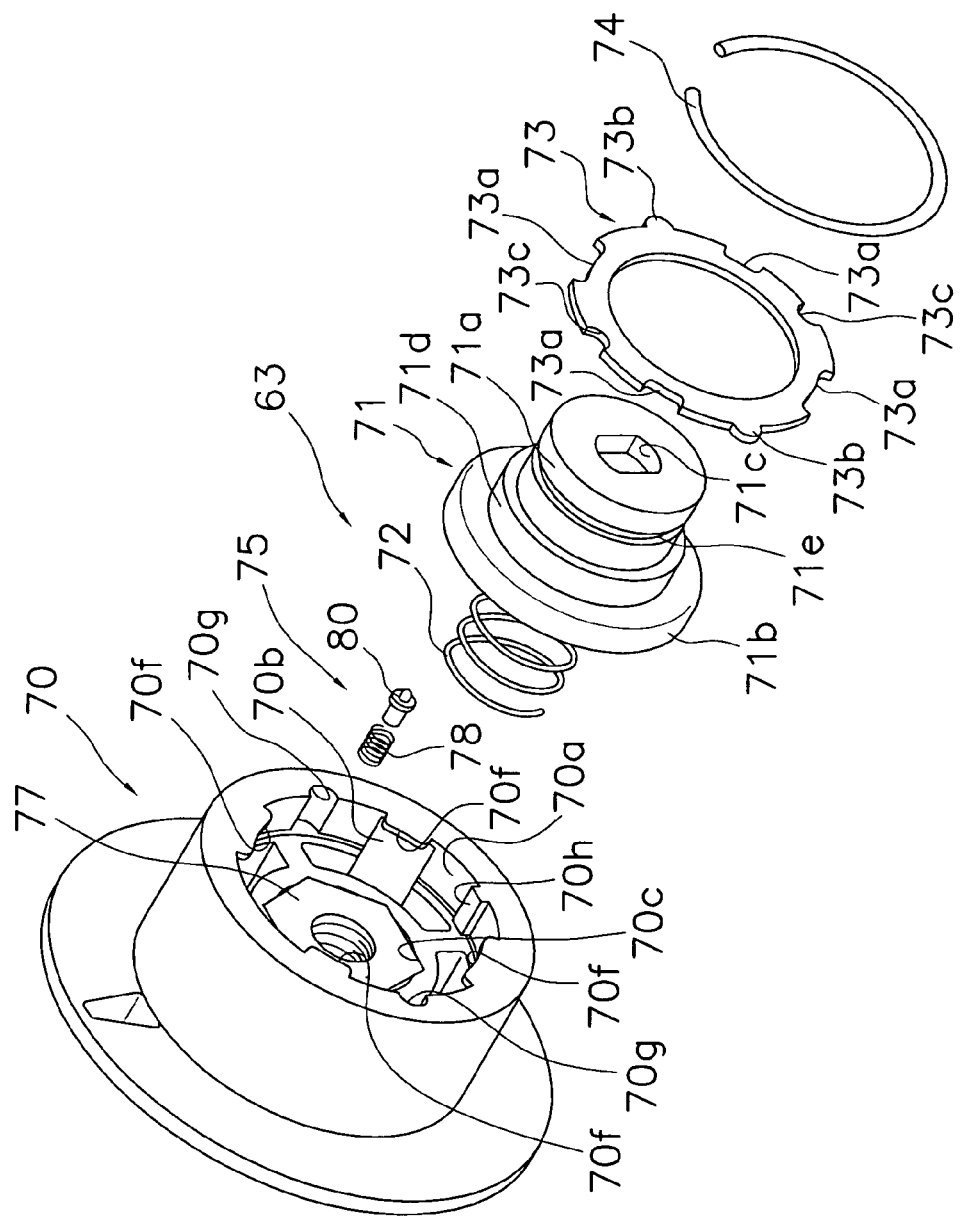
FIG. 10 is an exploded perspective view of a drag knob of the spinning reel drag mechanism in accordance with the first embodiment of the present invention.

As shown in FIGS. 7 and 10, the drag adjusting knob 63 includes a knob body 70, a pressing member 71, a coil spring 72, a retaining member 73, a retaining ring 74 and a second sound generating mechanism 75. The second sound generating mechanism 75 generates a sound when the drag mechanism 7 operates. The knob body 70 is for manually adjusting the drag force. The pressing member 71 is installed into the knob body 70. The pressing member 71 is able to rotate freely but cannot separate from the knob body 70. The coil spring 72 is arranged between the knob body 70 and the pressing member 71. The retaining member 73 is for retaining the pressing member 71 such that it does not separate from the knob body 70. The retaining ring 74 is for retaining the retaining member 73.

The knob body 70 is a cylindrical member having a brim. The knob body 70 is made of a synthetic resin material using, for example, an injection molding process. The knob body 70 includes a circular recess 70a and four (for example) protrusion forming grooves 70b. The protrusion forming grooves 70b are paced apart from one another along a circumferential direction of the knob body 70. The protrusion forming grooves 70b extend along the axial direction of the spool 4 from a frontward end face of the knob body 70 to a position slightly frontward of a rearward end face of the knob body 70 so as to pass through an outer edge portion of the recess 70a. The circular recess 70a opens at the rearward end face of the knob body 70. The protrusion forming grooves 70b are shaped like circular arcs. The protrusion forming grooves 70b are formed in the outside edges of fan shaped through holes that are formed to pass rearward from the frontward end face of the knob body 70 and extend to positions slightly in front of the rearward end face of the recess 70a. The protrusion forming grooves 70b have knob body protrusions 70f formed at ends of the protrusion forming grooves 70b. The knob body protrusions 70f hold the retaining ring 74. The through holes are covered by a seal 79 applied to the frontward surface of the knob body 70. The through holes enable the protrusion forming grooves 70b to be molded with a die. The seal 79 blocks the through holes and prevents water and contaminants from entering through the through holes, thereby facilitating formation of the protrusion forming grooves 70b using a molding process.

The knob body 70 further includes a nut holding section 70c, a generally trapezoidal knob protrusion 70d, an installation hole 70e and knob body interlock grooves 70g. Two knob body interlock grooves 70g are located opposite from each other in an inner diameter of the knob body 70. The nut holding section 70c is configured to hold a hexagonal nut 77 such that the nut 77 cannot rotate but can move in the axial direction. The nut holding section 70c is formed in a center portion of the knob body 70. The trapezoidal knob protrusion 70d is configured to span across a diameter of the knob body 70. The knob protrusion 70d is formed at the front side of the knob body 70. The installation hole 70e houses the second sound generating mechanism 75. The installation hole 70e is formed in a rearward surface of the knob body 70. The nut 77 is configured to screw onto an externally threaded section 15b provided on the forward end of the spool shaft 15.

The pressing member 71 is arranged between the second drag washer 62a and the knob body 70. The pressing member 71 is non-rotably mounted to the spool shaft 15. The pressing member 71 contacts a rearward end of the coil spring 72. The pressing member 71 exerts a pressing force on the first and second drag washers 61, 62a and 62b. The pressing force varies in accordance with the spring force of the coil spring 72. The pressing member 71 includes a cylindrical section 71a, a ring-shaped brim section 71b, an oval interlock hole 71c, a mounting section 71d and a seal installation groove 71e. The brim section 71b has a larger diameter than a diameter of the cylindrical section 71a. The brim section 71b is housed inside the recess 70a. The cylindrical section 71a projects rearwardly from the knob body 70. The oval interlock hole 71c is configured to non-rotatbly engage with the parallel axially chamfered sections 15a formed on the frontward end of the spool shaft 15. The oval interlock hole 71c is formed inside of the cylindrical section 71a. The coil spring 72 is housed inside the cylindrical section 71a. A plurality of hemispherical sound emitting holes 76 are formed in the frontward surface of the brim section 71b along a circle that is concentric with the brim section 71b. The mounting section 71d is formed on an outside circumference of the pressing member 71 between the cylindrical section 71a and the brim section 71b. The mounting section 71d is configured for the retaining member 73 to be mounted thereon. The seal installation groove 71e is formed in an external circumferential surface of the cylindrical section 71a. The seal installation groove 71e is configured for the seal member 66 to be installed therein.

The coil spring 72 is installed in a compressed state between the nut 77 and the pressing member 71. More specifically, the coil spring 72 is arranged so as to be in contact with the nut 77 and a bottom of the cylindrical section 71a while being guided by the inside of the cylindrical section 71a. The coil spring 72 enables the pressing force to be varied in a gradual manner by turning the knob body 70.

The retaining ring 74 is an elastic metal wire material that has been bent into a C-shape. The retaining ring 74 is configured to be used in a contracted (reduced-diameter) state when installed. The retaining ring 74 opens slightly when removed. The retaining ring 74 engages with the knob body protrusions 70f and contacts the rearward surface of the retaining member 73. As a result, the brim section 71b of the pressing member 71 will not separate from the knob body 70 when housed in the recess 70a.

The retaining member 73 is a generally ring-shaped member that is made of, for example, sheet metal. The retaining member 73 is configured to be mounted on the mounting section 71d of the pressing member 71. An outside circumference of the retaining member 73 has four retaining member recesses 73a, a pair of retaining member protrusions 73b and two retaining member interlock recesses 73c. The retaining member recesses 73a are configured and arranged to avoid the knob body protrusions 70f. The retaining member protrusions 73b are configured to engage with the two knob body interlock grooves 70g. The retaining member interlock recesses 73c are configured to engage with knob body interlock protrusions 70h formed in a rearward portion of the knob body 70 between the knob body interlock grooves 70g Before securing the pressing member 71 to the knob body 70 with the retaining member 73 and the retaining ring 74, the nut 77 must be housed in the nut holding section 70c and the coil spring 72 must be housed inside the pressing member 71. From this state, the pressing member 71 is inserted into the recess 70a of the knob body 70. Then, the retaining member protrusions 73b and the retaining member interlock recesses 73c of the retaining member 73 are aligned with the knob body interlock grooves 70g and the knob body interlock protrusion 70h. The retaining member 73 is mounted onto the mounting section 71d. Finally, the retaining ring 74 is hooked onto the inside faces of the protrusions 70f in a contracted state. As a result, the pressing member 71 is mounted to the knob body 70 such that it freely rotates but cannot separate from the knob body 70.

The second sound generating mechanism 75 has a plurality of sound emitting holes 76, a sound emitting pin 80 and a coil spring 78. The sound emitting holes 76 are formed in the pressing member 71. The sound emitting pin 80 is installed in the installation hole 70e. The coil spring 78 is configured and arranged to spring load the sound emitting pin 80 toward the sound emitting holes 76. The sound emitting holes 76 are arranged along a circle that is concentric with the pressing member 71. The sound emitting holes 76 are positioned in order to be selectively aligned with the sound emitting pin 80. The sound emitting pin 80 has a middle portion with a diameter that is larger than a diameter of either a frontward end or a rearward end. The frontward end of the sound emitting pin 80 is rounded in a generally hemispherical shape. When the drag force of the drag mechanism 7 is adjusted by rotating the knob body 70 relative to the pressing member 71, a sound is generated by the repetitive impact of the sound emitting pin 80 against the sound emitting holes 76.

The first sound generating mechanism 65 is configured to generate a sound when the spool shaft 15 and the spool 4 undergo relative rotation during operation of the drag mechanism 7. As shown in FIG. 7, the first sound generating mechanism 65 has a sound emitting member 81, a claw-like member 82 and a spring member (not shown). The sound emitting member 81 is non-rotatably mounted to the spool shaft 15. The claw-like member 82 is pivotally mounted to the spool 4. The claw-like member 82 is configured and arranged to repetitively impact the sound emitting member 81. The spring member (not shown) is configured and arranged to spring load the claw-like member 82.

Referring to FIG. 9, a maximum dimension L1 of the first drag washer 61 and a maximum dimension L2 of a conventional drag washer is shown. Since only one interlock protrusion 61a is provided on the first drag washer 61, the maximum dimension L1 of the first drag washer 61 is smaller than the maximum dimension L2 of the conventional first drag washer. The conventional first drag washer has two interlock protrusions arranged on diametrically opposite sides. The maximum dimension L2 of the conventional first drag washer is a distance L2 between outermost edges of the two interlock protrusions. As a result, the first drag washer 61 is tilted to a smaller degree than the conventional first drag washer when the first drag washer 61 is tilted in order to pass through the tubular section 55a. Thus, a length that the tilted first drag washer 61 assumes in the longitudinal direction (axial direction) is shortened. In this way, the internal diameter of the drag housing recess 60 is increased even if the longitudinal length of the same is shorter.

The drag force is adjusted before fishing based on the size and type of fish. The drag force is adjusted by turning the drag adjusting knob 63. For example, when the drag adjusting knob 63 is turned clockwise, the nut 77, which is screwed onto the spool shaft 15, gradually increases the spring loading force of the coil spring 72. The pressing member 71 presses against the drag washer 62a through the coil spring 72, thereby increasing the drag force. When the drag adjusting knob 63 is turned, the relative rotation between the pressing member 71 and the knob body 70 causes the sound emitting pin 80 of the second sound generating mechanism 75 to repeatedly strike the sound emitting holes 76 with a prescribed interval between strikes, thereby generating a crisp and pleasant clicking sound.

When the fishing line is to be cast, the user inverts the bail arm 44 to a fishing line release position. This inversion causes the first bail support member 40 and the second bail support part 42 to pivot. The user then holds the fishing line with the index finger of the hand that is grasping the fishing rod and casts the fishing rod. The fishing line dispenses vigorously due to the weight of the terminal tackle. When the user rotates the handle 1 in the reel-in direction from this state, the rotation transfer mechanism 5 causes the rotor 3 to rotate in the reel-in direction and the oscillating mechanism 6 causes the spool to move to and fro along the longitudinal direction in a reciprocating fashion. Meanwhile, a bail inverting mechanism (not shown) restores the bail arm 44 to the fishing line reel-in position so that the fishing line is wound onto the spool 4.

Now, if a fish is hooked and the drag mechanism 7 operates, the spool 4 will rotate relative to the spool shaft 15 and the first sound generating mechanism 65 will sound to inform the fisherperson that something is pulling the line and the drag mechanism 7 is operating. The spool 4 rotates in the reel-out (line dispensing) direction at the set drag force.

There are times when a fisherperson will prepare a plurality of spools 4 in advance, each having a different type of fishing line wound thereon, and change the spool 4 used on the fishing rod depending on the type of fishing being conducted. In such cases, the spool 4 is removed from the spool shaft 15 by loosening the drag adjusting knob 63. With this embodiment, the pressing member 71 does not fall off of the knob body 70 when the spool 4 is removed because the pressing member 71 is coupled to the knob body 70 by the retaining member 73 and the retaining ring 74. Similarly, the first and second drag washers 61, 62a and 62b do not fall from the spool 4 because they are held by the retaining spring 67.

In conventional reels, this kind of retaining spring 67 and retaining ring 74 are installed so as to interlock with annular grooves formed using a machining process and thus a machining process is required in order to form the grooves. Conversely, in this embodiment, the retaining spring 67 is installed between the rearward end face of the tubular section 55a and the axially facing step surface that exists between the frontward portion 60a and rearward portion 60b of the drag housing recess 60. The retaining ring 74 is installed so as to engage with knob body protrusions 70f formed by through holes that can be formed during die molding of the knob body 70. As a result, a separate machining process is not necessary to provide a means of securing the retaining spring 67 and the retaining ring 74. As a result, the manufacturing cost is reduced.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

Second Embodiment

Figure 12:
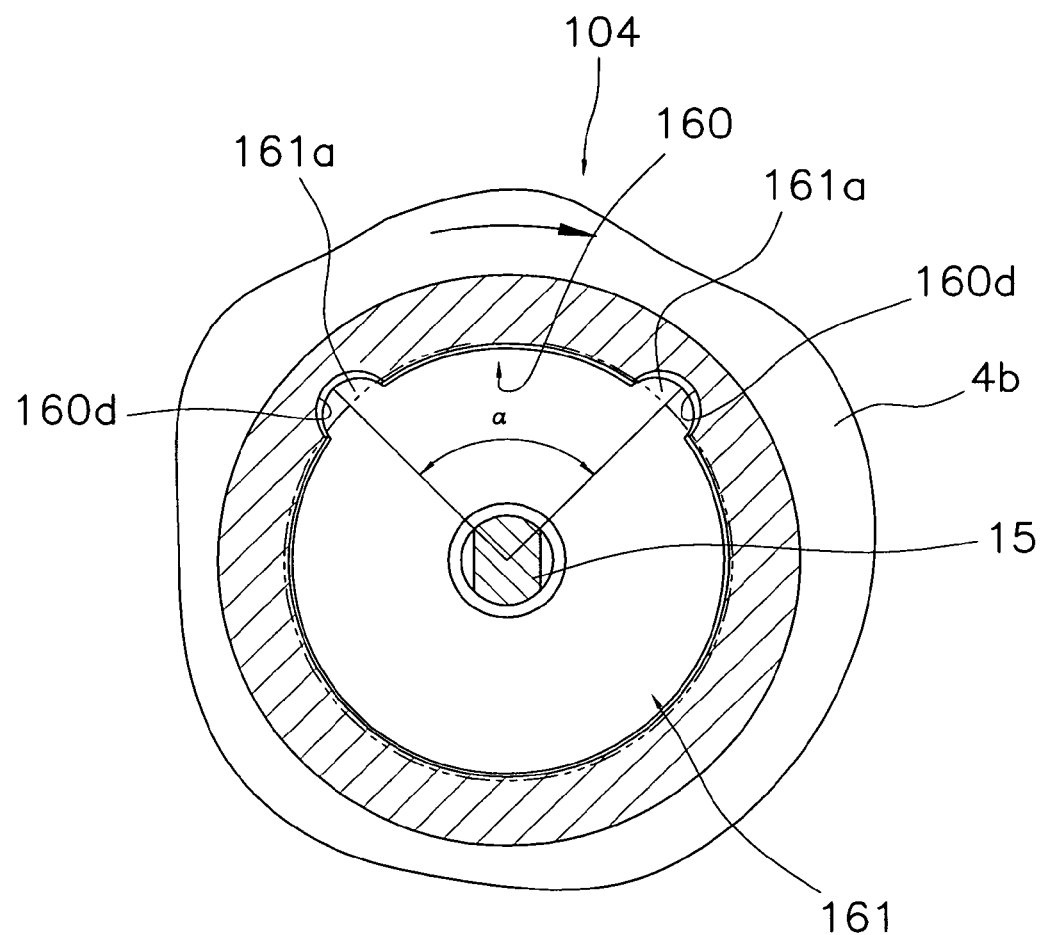
FIG. 12 is a partial cross sectional view of a modification of the spool in FIG. 9 in accordance with a second embodiment of the present invention.

Referring now to FIG. 12, a first drag washer 161 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The second embodiment is the same as the first embodiment except that the first drag washer 61 is replaced with a first drag washer 161 having two interlock protrusions 161a and the drag housing recess 60 is replaced with a drag housing recess 160 having two interlock grooves 160d. The interlock protrusions 161a are disposed on the first drag washer 161 with an angular phase α of 90 degrees therebetween. Similarly, the two interlock grooves 160d are arranged with an angular phase α of 90 degrees therebetween. The interlock protrusions 161a protrude from about 5% to 10% of a diameter of the first drag washer 161. Preferably, the phase angle α is about 90 degrees or less. If the phase angle α is greater than 90 degrees, it will be difficult to pass the first drag washer 161 through the tubular section 55a in order to install the first drag washer 161 into the drag housing recess 160.

Although in the foregoing embodiments there are one first drag washer 61 and two second drag washers 62a and 62b, it will be apparent to one of skill in the art from this disclosure that any number of drag washers is acceptable so long as there is at least one first drag washer 61 and at least one second drag washer 62a or 62b.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spinning reel spool assembly comprising:
   a spool having a drag housing recess formed in an internal circumferential surface of the spool, the drag housing recess having at least one interlock groove extending in a longitudinal direction of the spool, and a flange fastening member having a tubular section threaded into the drag housing recess; and a spinning reel drag mechanism configured to brake a rotation of the spool and arranged between the spool and a spool shaft, the spinning reel drag mechanism including at least one first drag washer having an outer circumferential portion with at least one interlock protrusion configured to engage with the interlock groove, the outer circumferential portion being free of an interlock protrusion at a section diametrically opposed to the at least one interlock protrusion, the at least one first drag washer being non-rotatable with respect to the spool in the drag housing recess and having an outside diameter that is smaller than an internal diameter of the tubular section of the flange fastening member.

at least one second drag washer configured to be arranged with respect to the first drag washer along the longitudinal direction of the spool, the at least one second drag washer being non-rotatable with respect to the spool shaft, the at least one second drag washer having an outside diameter that is smaller than an internal diameter of the tubular section of the flange fastening member, and a drag knob configured and arranged to be threaded onto the spool shaft to selectively adjust an amount of pressure acting on the first and second drag washers, the internal diameter of the tubular section being smaller than a maximum dimension of the at least one first drag washer, the maximum dimension being a length from an outermost edge of the at least one interlock protrusion to the outer circumferential portion at the section diametrically opposed to the at least one interlock protrusion.

2. The spinning reel spool assembly as recited in claim 1, wherein the outer circumferential portion has a plurality of interlock protrusions arranged within an angular phase of 90 degrees or less therebetween.

3. The spinning reel spool assembly as recited in claim 2, further comprising a seal member disposed between the drag knob and the first and second drag washers to prevent liquids from penetrating to the first and second drag washers.

4. The spinning reel spool assembly as recited in claim 2, further comprising one or more drag disks arranged between the first and second drag washers.

5. The spinning reel spool assembly as recited in claim 2, further comprising a retaining mechanism for retaining the at least one first and second drag washers inside the spool.

6. The spinning reel spool assembly as recited in claim 1, further comprising a seal member disposed between the drag knob and the first and second drag washers to prevent liquids from penetrating to the first and second drag washers.

7. The spinning reel spool assembly as recited in claim 1, further comprising one or more drag disks arranged between the first and second drag washers.

8. The spinning reel spool assembly as recited in claim 1, further comprising a retaining mechanism for retaining the at least one first and second drag washers inside the spool.

9. A spinning reel comprising:

a handle;

a reel unit rotatively supporting the handle;

a rotor rotatively supported on a front of the reel unit;

a spool disposed at a front of the rotor and having a drag housing recess formed in an internal circumferential surface of the spool, the drag housing recess having at least one interlock groove extending in a longitudinal direction of the spool, and a flange fastening member having a tubular section threaded into the drag housing recess;

a spool shaft disposed generally parallel to the longitudinal direction of the spool; and a spinning reel drag mechanism configured to brake a rotation of the spool and arranged between the spool and the spool shaft, the spinning reel drag mechanism including at least one first drag washer having an outer circumferential portion with at least one interlock protrusion configured to engage with the interlock groove, the outer circumferential portion being free of an interlock protrusion at a section diametrically opposed to the at least one interlock protrusion, the at least one first drag washer being non-rotatable with respect to the spool in the drag housing recess and having an outside diameter that is smaller than an internal diameter of the tubular section of the flange fastening member, at least one second drag washer configured to be arranged with respect to the first drag washer along the longitudinal direction of the spool, the at least one second drag washer being non-rotatable with respect to the spool shaft, the at least one second drag washer having an outside diameter that is smaller than an internal diameter of the tubular section of the flange fastening member, and a drag knob threaded onto the spool shaft to selectively adjust an amount of pressure acting on the first and second drag washers, the internal diameter of the tubular section being smaller than a maximum dimension of the at least one first drag washer, the maximum dimension being a length from an outermost edge of the at least one interlock protrusion to the outer circumferential portion at the section diametrically opposed to the at least one interlock protrusion.

10. The spinning reel drag mechanism as recited in claim 9, wherein the outer circumferential portion has a plurality of interlock protrusions arranged within an angular phase of 90 degrees or less therebetween.

11. The spinning reel as recited in claim 10, further comprising a seal member arranged between the drag knob and the flange fastening member to prevent liquids from penetrating to the first and second drag washers.

12. The spinning reel as recited in claim 10, further comprising one or more drag disks arranged between the first and second drag washers.

13. The spinning reel as recited in claim 10, further comprising a retaining mechanism for retaining the drag washers that is detachably disposed between an end face of the tubular section that faces the first and second drag washers and the first and second drag washers.

14. The spinning reel as recited in claim 9, further comprising
a seal member arranged between the drag knob and the flange fastening member to prevent liquids from penetrating to the first and second drag washers.

15. The spinning reel as recited in claim 9, further comprising
one or more drag disks arranged between the first and second drag washers.

16. The spinning reel as recited in claim 9, further comprising
a retaining mechanism for retaining the drag washers that is detachably disposed between an end face of the tubular section that faces the first and second drag washers and the first and second drag washers.

* * * * *